United States Patent
Teramura et al.

(10) Patent No.: US 7,181,105 B2
(45) Date of Patent: Feb. 20, 2007

(54) METHOD FOR ADJUSTING ALIGNMENT OF LASER BEAMS IN COMBINED-LASER-LIGHT SOURCE WHERE THE LASER BEAMS ARE INCIDENT ON RESTRICTED AREA OF LIGHT-EMISSION END FACE OF OPTICAL FIBER

(75) Inventors: Yuichi Teramura, Kaisei-machi (JP); Yoji Okazaki, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 439 days.

(21) Appl. No.: 10/808,587

(22) Filed: Mar. 25, 2004

(65) Prior Publication Data

US 2004/0247240 A1    Dec. 9, 2004

(30) Foreign Application Priority Data

Mar. 25, 2003    (JP)    ............................. 2003-083125

(51) Int. Cl.
*G02B 6/26*    (2006.01)
*H01S 3/10*    (2006.01)

(52) U.S. Cl. .............................. 385/27; 385/33; 372/20

(58) Field of Classification Search .................. 372/20, 372/29.01; 385/27–33
See application file for complete search history.

(56) References Cited

U.S. PATENT DOCUMENTS

| | | | |
|---|---|---|---|
| 5,185,758 A | | 2/1993 | Fan et al. |
| 5,208,881 A | * | 5/1993 | Bruesselbach ................ 385/27 |
| 5,513,201 A | * | 4/1996 | Yamaguchi et al. .......... 372/75 |
| 5,592,333 A | * | 1/1997 | Lewis .......................... 359/628 |
| 5,617,492 A | * | 4/1997 | Beach et al. ................... 385/33 |
| 5,633,967 A | * | 5/1997 | Haruta .......................... 385/50 |
| 5,787,107 A | * | 7/1998 | Leger et al. ................... 372/71 |
| 5,790,729 A | * | 8/1998 | Pologe et al. ................. 385/46 |
| 5,928,222 A | * | 7/1999 | Kleinerman .................. 606/16 |
| 6,005,717 A | * | 12/1999 | Neuberger et al. .......... 359/619 |
| 6,151,168 A | * | 11/2000 | Goering et al. ............. 359/623 |
| 6,167,075 A | * | 12/2000 | Craig et al. .................... 372/75 |
| 6,215,598 B1 | * | 4/2001 | Hwu .......................... 359/641 |
| 6,327,292 B1 | * | 12/2001 | Sanchez-Rubio et al. ..... 372/92 |
| 6,356,574 B1 | * | 3/2002 | Craig et al. .................... 372/75 |
| 6,400,513 B1 | * | 6/2002 | Southwell .................... 359/641 |
| 2002/0090172 A1 | * | 7/2002 | Okazaki et al. ............... 385/27 |
| 2003/0021493 A1 | | 1/2003 | Nakaya et al. |
| 2003/0142903 A1 | * | 7/2003 | Johnson et al. ............... 385/31 |
| 2004/0091013 A1 | * | 5/2004 | Yamaguchi et al. ........ 372/108 |

FOREIGN PATENT DOCUMENTS

JP    2003-338432 A    12/2000

* cited by examiner

*Primary Examiner*—Minsun Oh Harvey
*Assistant Examiner*—Phillip Nguyen
(74) *Attorney, Agent, or Firm*—Sughrue Mion, PLLC

(57) ABSTRACT

A combined-laser-light source includes: a plurality of semiconductor lasers; an optical fiber; and an optical system which converges a bundle of laser beams emitted from the plurality of semiconductor lasers, and makes the converged bundle of the laser beams enter the core of the optical fiber so that the laser beams are combined in the optical fiber when the laser beams pass through the optical fiber. The optical system is aligned with the optical fiber so that the converged bundle of the laser beams is incident on an area of an end face of the core when steady temperature control is performed on the combined-laser-light source, where the area is concentric with the end face of the core, and has a diameter equal to or smaller than half of the diameter of the core.

8 Claims, 21 Drawing Sheets

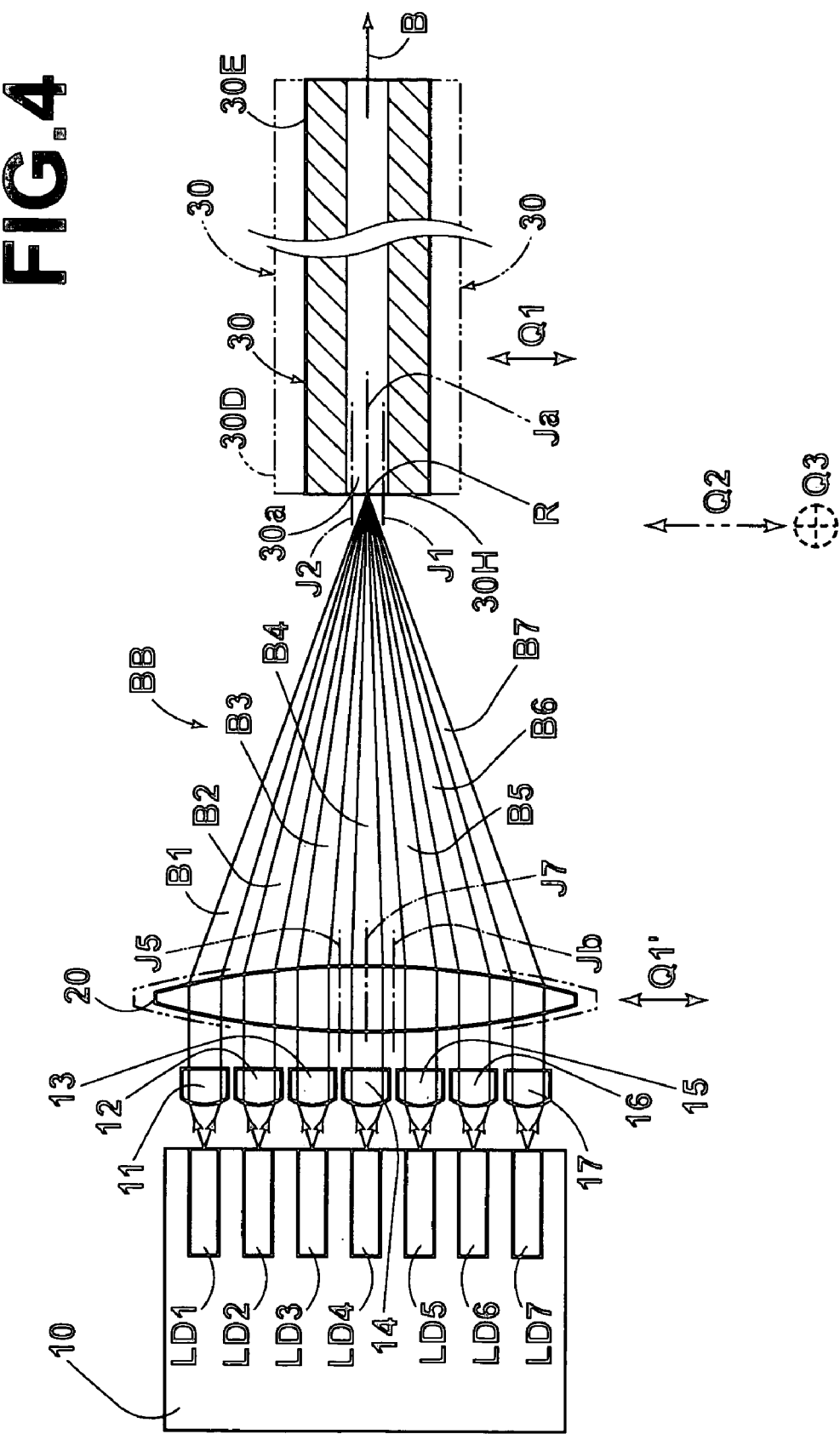

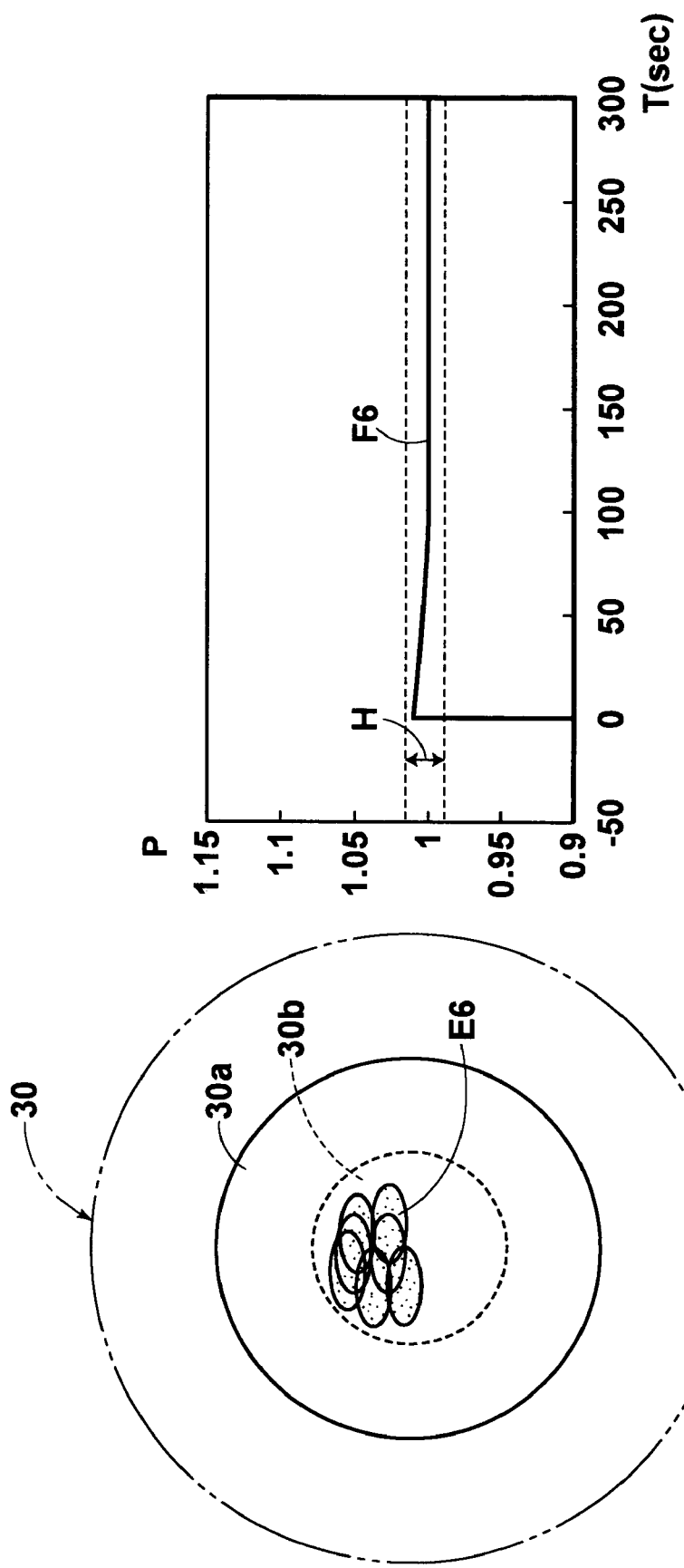

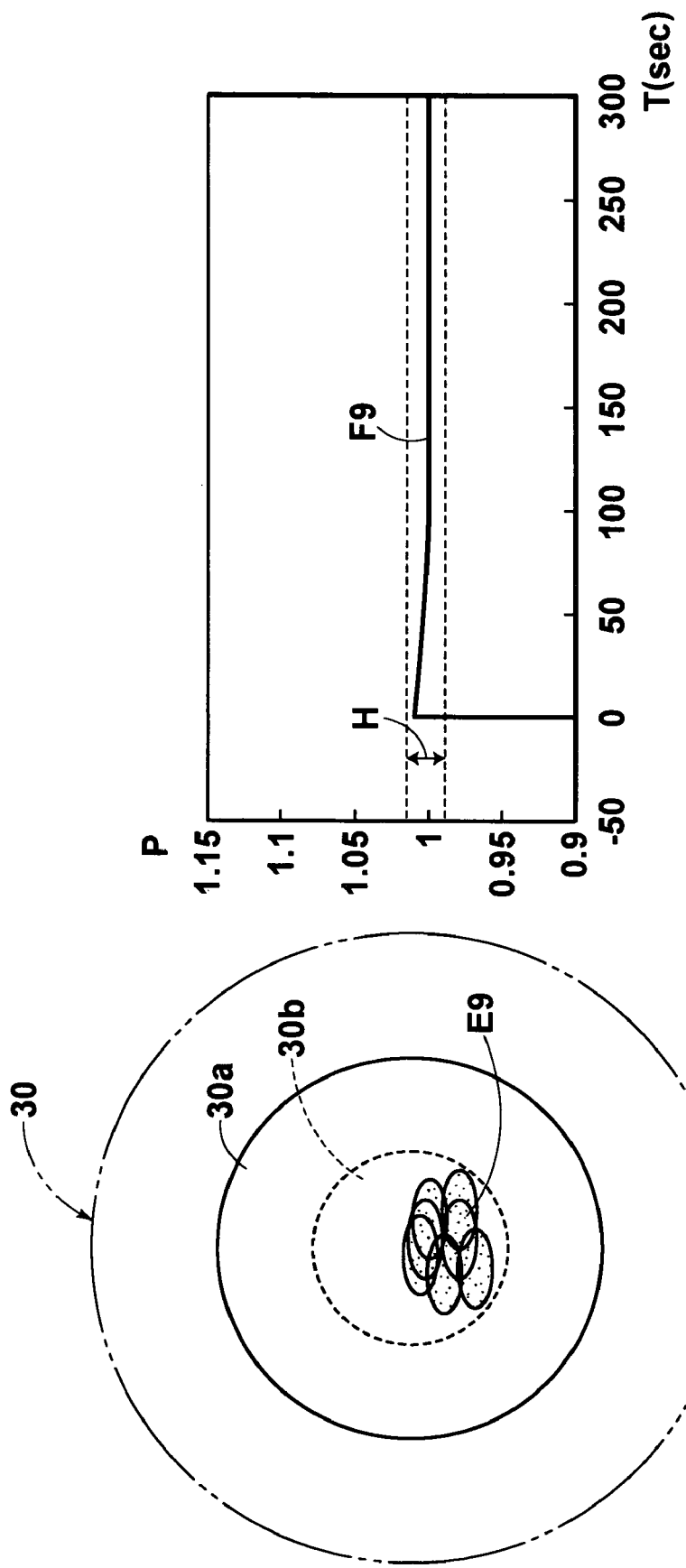

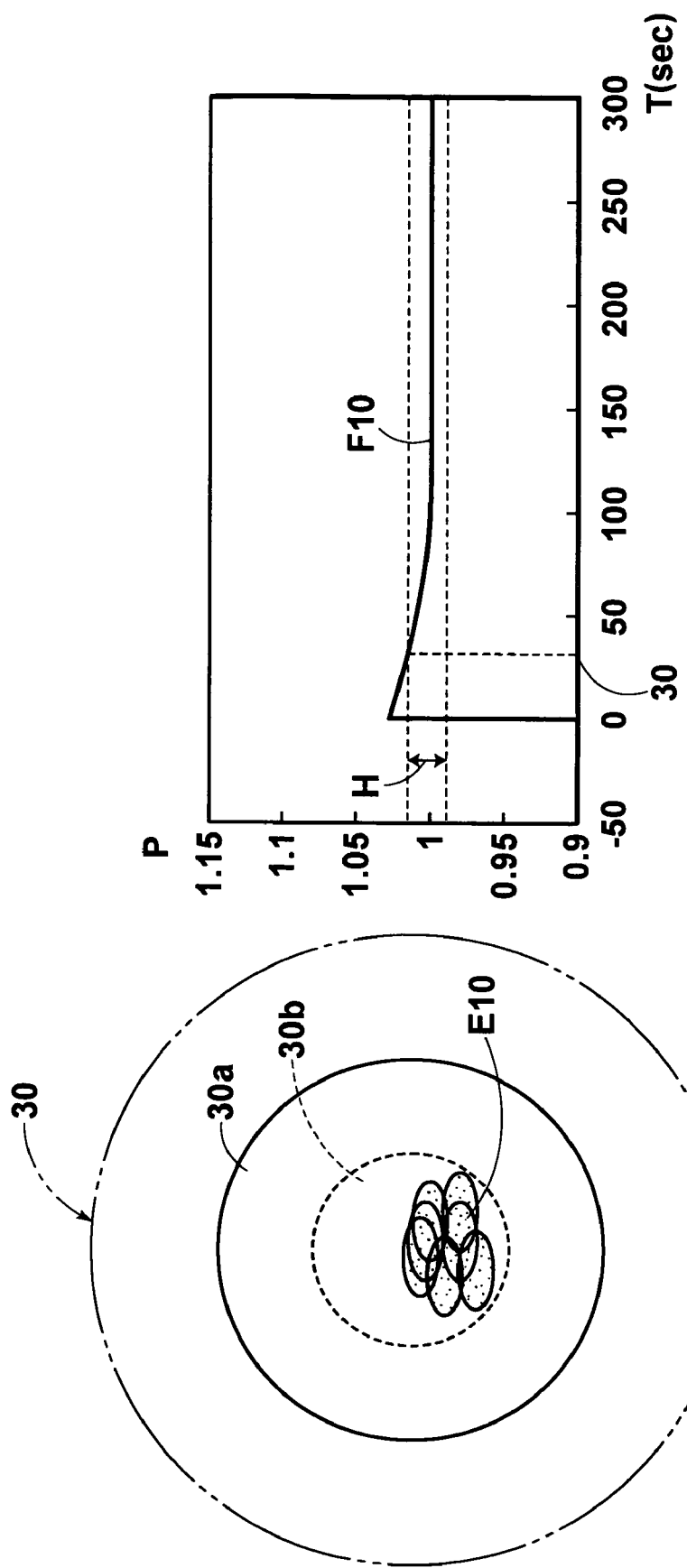

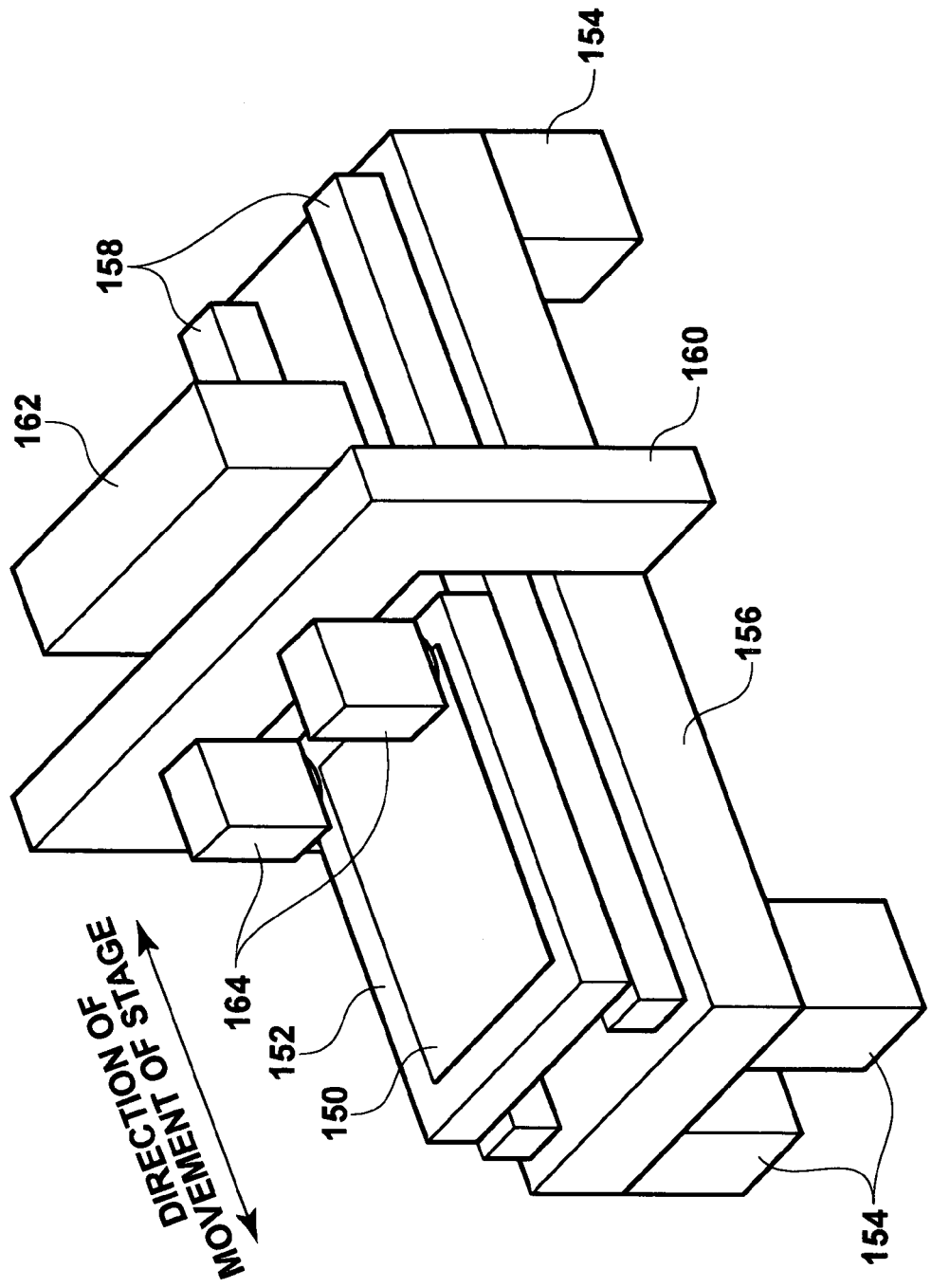

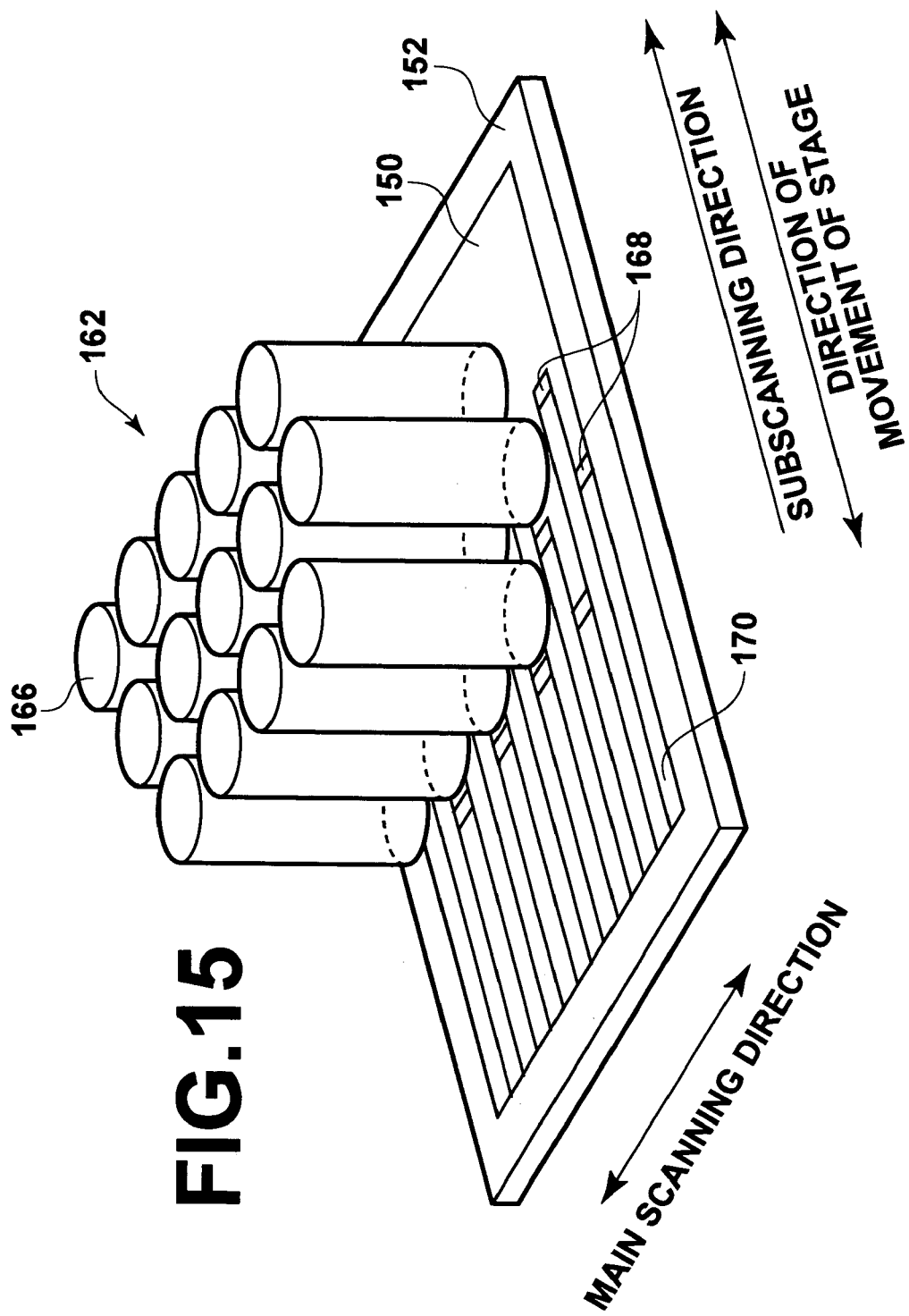

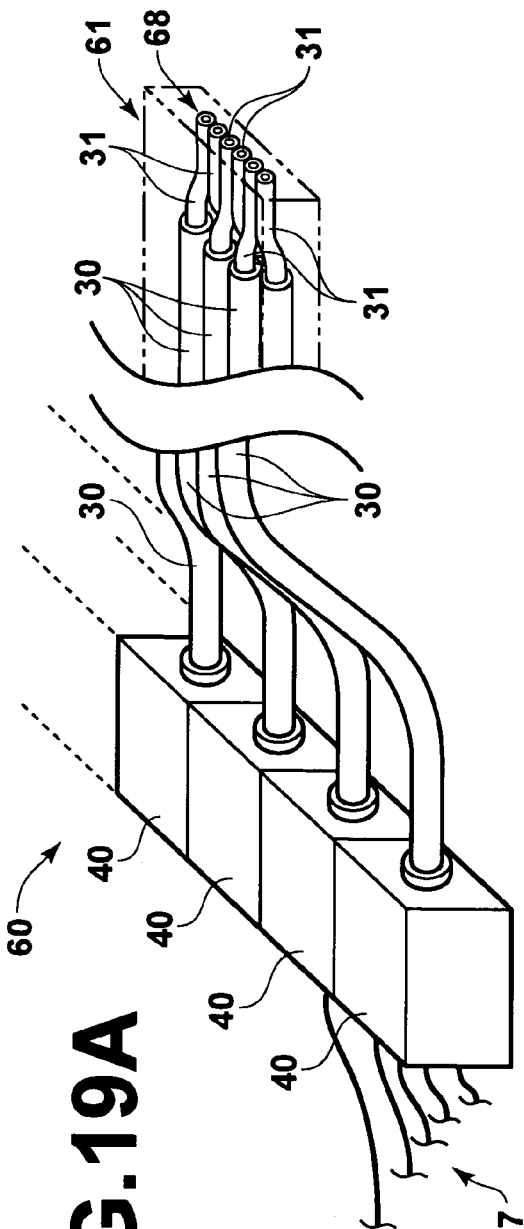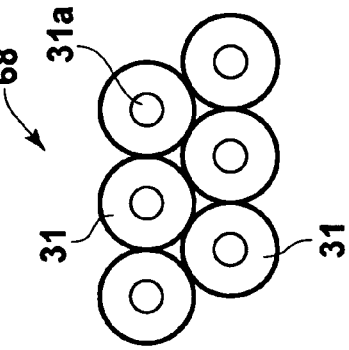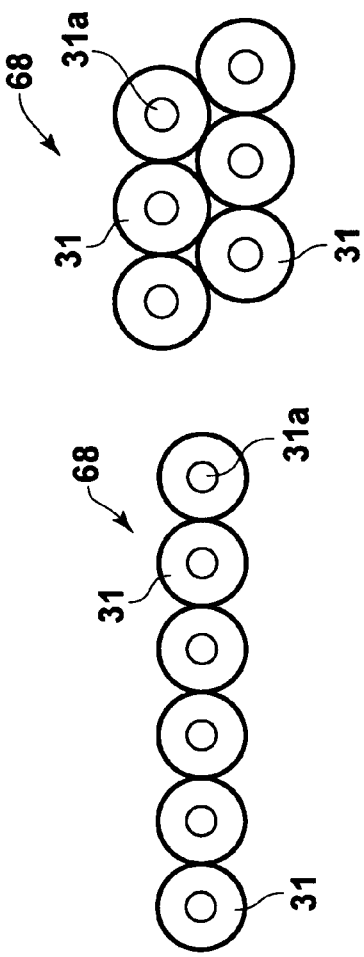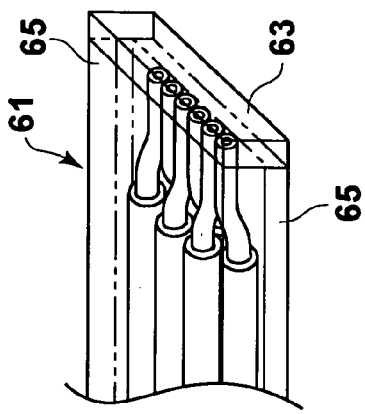

METHOD FOR ADJUSTING ALIGNMENT OF LASER BEAMS IN COMBINED-LASER-LIGHT SOURCE WHERE THE LASER BEAMS ARE INCIDENT ON RESTRICTED AREA OF LIGHT-EMISSION END FACE OF OPTICAL FIBER

BACKGROUND OF THE INVENTION

1. Field of the Invention

The present invention relates to a laser-light alignment method for adjusting alignment of laser beams emitted from a plurality of semiconductor lasers with an optical fiber in which the laser beams are to be combined (optically multiplexed). The present invention also relates to a combined-laser-light source to which the above laser-light alignment method is applied. The present invention further relates to an exposure system having the above combined-laser-light source.

2. Description of the Related Art

The following documents (1) and (2) disclose information related to the present invention.

(1) U.S patent Laid-Open No. 20020090172)

(2) Japanese Unexamined Patent Publication No. 2000-338432

Conventionally, various combined-laser-light sources are known. In the combined-laser-light sources, an entire bundle of laser beams emitted from a plurality of semiconductor lasers is converged and enters a single optical fiber so that a laser beam having a high output power is outputted from the optical fiber, for example, as disclosed in the above document (1). In addition, in various exposure systems and the like which are currently known, a laser beam is applied to a photosensitive material so as to expose the photosensitive material as disclosed on the document (2).

Incidentally, the output power of exposure-light sources is required to be increased in order to increase the processing speed in the exposure systems. In particular, in order to increase the output power of the exposure-light sources without increase in the system size, use of the aforementioned combined-laser-light sources can be considered. However, since the lifetimes of the semiconductor lasers (e.g., about 10,000 hours) are shorter than those of the exposure systems, there are demands for powering the semiconductor lasers in each exposure system only when a photosensitive material is exposed, and powering off the semiconductor lasers when no photosensitive material is exposed even during operating time of the exposure system in order to apparently lengthen the lifetimes of the semiconductor lasers.

Nevertheless, every time the semiconductor lasers are powered on, it is necessary to wait for a startup time until the output power of the combined-laser-light source becomes stable and usable (i.e., until the combined-laser-light source start up). Therefore, it is difficult to power on the semiconductor lasers only when a photosensitive material is exposed, without interfering with operations of the exposure system.

For example, in the case where a laser output power of 150 mW is obtained from a combined-laser-light source having a module in which seven laser beams are combined into a single laser beam, the applicants have experimentally confirmed that the startup time, i.e., the time elapses since powering on of semiconductor lasers until startup of the combined-laser-light source is about one minute. However, in order to power on and off semiconductor lasers in a combined-laser-light source without interfering with operations of the exposure system, it is desirable that the startup time is about one second. In addition, in order to increase productivity of the exposure system, further increase is required in the output power of the exposure system. However, it is confirmed that the startup time increases with increase in the output power. Further, in the case where a plurality of (e.g., seven) laser beams are combined in a single module, it is required that the seven laser beams do not spread wide.

Furthermore, the combined-laser-light source in which laser beams emitted from a plurality of GaN semiconductor lasers are combined into a single laser beam has a short wavelength, and is suitable for use as a light source for highly fine exposure of a photosensitive material. However, the applicants have also experimentally confirmed that a long time is necessary for the GaN semiconductor lasers to start up after the GaN semiconductor lasers are powered on.

SUMMARY OF THE INVENTION

The present invention has been developed in view of the above circumstances.

A first object of the present invention is to provide a laser-light alignment method for adjusting alignment of laser light so as to reduce the startup time of a combined-laser-light source.

A second object of the present invention is to provide a combined-laser-light source which has a short startup time.

A third object of the present invention is to provide an exposure system which includes a combined-laser-light source having a short startup time.

In order to accomplish the above first object, the first aspect of the present invention is provided. According to the first aspect of the present invention, there is provided a laser-light alignment method for adjusting alignment of laser light in a combined-laser-light source in which a bundle of laser beams emitted from a plurality of semiconductor lasers is converged through an optical system and enters a core portion of a light-entrance end of an optical fiber so that the laser beams are combined in the optical fiber, and the combined laser beams are outputted from a light-emission end of the optical fiber. The laser-light alignment method comprises: (a) maintaining the combined-laser-light source in a condition in which steady temperature control is performed; (b) measuring light intensity of the combined laser beams outputted from the light-emission end of the optical fiber, while moving the light-entrance end of the optical fiber in a direction parallel to an end face at the light-entrance end so that the center of an area of the end face through which the laser beams emitted from the plurality of semiconductor lasers enter the optical fiber moves along a diameter passing through the center of the core portion; (c) determining two positions of the light-entrance end at which the light intensity measured in step (b) is equal to a certain value which is smaller than the maximum value of the light intensity measured in step (b); and (d) aligning a center of the core portion of the optical fiber with a middle position between the two positions determined in step (c).

In step (b), the optical fiber may be moved in such a manner that the orientation of the optical fiber is not changed.

In addition, in order to accomplish the first object, the second aspect of the present invention is also provided. According to the second aspect of the present invention, there is provided a laser-light alignment method for adjusting alignment of laser light in a combined-laser-light source in which a bundle of laser beams emitted from a plurality of semiconductor lasers is converged through a convergence lens and enters a core portion of a light-entrance end of an optical fiber so that the laser beams are combined in the optical fiber, and the combined laser beams are outputted from a light-emission end of the optical fiber. The laser-light alignment method comprises: (a) maintaining the combined-laser-light source in a condition in which steady temperature control is performed; (b) measuring light intensity of the combined laser beams outputted from the light-emission end of the optical fiber, while moving the convergence lens in a direction perpendicular to an optical axis of the convergence lens so that the center of an area of the end face through which the laser beams emitted from the plurality of semiconductor lasers enter the optical fiber moves along a diameter passing through the center of the core portion; (c) determining two positions of the optical axis of the convergence lens at which the light intensity measured in step (b) is equal to a certain value which is smaller than the maximum value of the light intensity measured in step (b); and (d) placing the optical axis of the convergence lens at a middle position between the two positions determined in step (c).

In order to accomplish the second object, the third aspect of the present invention is provided. According to the third aspect of the present invention, there is provided a combined-laser-light source comprising: a plurality of semiconductor lasers; an optical fiber which has a core; and an optical system which converges a bundle of laser beams emitted from the plurality of semiconductor lasers, and makes the converged bundle of the laser beams enter the core of the optical fiber so that the laser beams are combined in the optical fiber when the laser beams pass through the optical fiber. The optical system and the optical fiber are aligned with each other so that the converged bundle of the laser beams is incident on an area of an end face of the core when steady temperature control is performed on the combined-laser-light source, where the area is concentric with the end face of the core, and has a diameter equal to or smaller than half of the diameter of the core.

In the combined-laser-light source according to the third aspect of the present invention, the area of the end face of the core has approximately similar shape to the shape of the end face of the core, and shares a common center with the end face of the core.

In the first to third aspects of the present invention, the "steady temperature control" is temperature control of the combined-laser-light source which is performed so that the output power of the combined-laser-light source is stable within a predetermined usable range. Although, generally, various types of temperature control can be performed on combined-laser-light sources, the above "steady temperature control" can be realized, for example, by performing a predetermined type of temperature control on the combined-laser-light source, powering the semiconductor lasers, and leaving the combined-laser-light source until the output power of the combined-laser-light source becomes stable. Alternatively, it is possible to realize the above "steady temperature control" by another technique without powering the semiconductor lasers.

The combined-laser-light source according to the third aspect of the present invention may also have one or any possible combination of the following additional features (i) to (iii).

(i) The plurality of semiconductor lasers may be GaN-based compound semiconductor lasers.

(ii) The optical fiber may be a multimode optical fiber.

(iii) In the combined-laser-light source having the feature (ii), the optical fiber may be a multimode optical fiber.

According to the fourth aspect of the present invention, there is provided an exposure system comprising a combined-laser-light source, a spatial light-modulation device, and an image-forming optical system. The combined-laser-light source includes: a plurality of semiconductor lasers; an optical fiber which has a core; and an optical system which converges a bundle of laser beams emitted from the plurality of semiconductor lasers, and makes the converged bundle of the laser beams enter the core of the optical fiber so that the laser beams are combined in the optical fiber when the laser beams pass through the optical fiber, where the optical system and the optical fiber are aligned with each other so that the converged bundle of the laser beams is incident on an area of an end face of the core when steady temperature control is performed on the combined-laser-light source, and the area is concentric with the end face of the core, and has a diameter equal to or smaller than half of a diameter of the core. In the spatial light-modulation device, a plurality of light-modulation elements are arrayed, where light-modulation conditions in the plurality of light-modulation elements are respectively changed according to control signals so that the plurality of light-modulation elements individually and optically modulate and output respective portions of the bundle of laser beams combined in the optical fiber when the respective portions are incident on the plurality of light-modulation elements. The image-forming optical system forms an image on an exposure surface with the respective portions of the bundle of laser beams combined in the optical fiber and optically modulated by and outputted from the plurality of light-modulation elements.

In the exposure system according to the fourth aspect of the present invention, the image-forming optical system may comprise a microlens array comprised of a plurality of microlenses arrayed in correspondence with the plurality of light-modulation elements, respectively, so that the plurality of microlenses individually condense the respective portions of the bundle of laser beams combined in the optical fiber and optically modulated by and outputted from the plurality of light-modulation elements.

The applicants have investigated the combined-laser-light sources which combine laser beams emitted from a plurality of semiconductor lasers and output the combined laser beams from a single optical fiber, while focusing attention on the startup times of the combined-laser-light sources, and found a phenomenon in which the startup time of each combined-laser-light source varies depending on the incident position of each laser beam on the core portion of the optical fiber. In addition, the applicants have further investigated effects of further limitation of the area through which the entire bundle of the laser beams enters the core portion, and found that when the area through which the entire bundle of the laser beams enters the core portion is limited to a specific area, the startup time of each combined-laser-light source can be reduced. Thus, the present invention is made based on the above findings.

Conventionally, it has been considered that entrance of the entire bundle of laser beams into the core portion and limitation of the incident angle of each laser beam on the core portion to a certain value determined by the numerical aperture (NA) of the optical fiber suffice for combining the laser beams by injecting the laser beams into an optical fiber.

According to the first aspect of the present invention, it is possible to accurately inject the entire bundle of laser beams into a restricted concentric region of the core portion which is located at the center of the core portion. Therefore, the startup time of the combined-laser-light source can be reduced.

That is, in the laser-light alignment method according to the first aspect of the present invention, the light intensity of the combined laser beams outputted from the light-emission end of the optical fiber is measured while moving the light-entrance end of the optical fiber in a direction parallel to the end face at the light-entrance end so that the center of an area of the end face through which the laser beams emitted from the plurality of semiconductor lasers enter the optical fiber moves along a diameter passing through the center of the core portion. With the movement of the light-entrance end of the optical fiber, the light intensity measured as above monotonously increases to the maximum value, and monotonously decreases from the maximum value. The relationship between the light intensity and the position of the light-entrance end of the optical fiber shows a characteristic which is symmetric with respect to the position at which the light intensity is maximized. When the light-entrance end of the optical fiber is located in a position in which the light intensity is close to the maximum value, variations in the light intensity are small. However, when the light-entrance end of the optical fiber is located in a position in which the light intensity is substantially smaller than the maximum value, variations in the light intensity are great, and thus it is possible to accurately determine the two positions of the light-entrance end of the optical fiber at which the light intensity measured in step (b) is equal to a certain value which is smaller than the maximum value of the light intensity measured in step (b). Consequently, when the center of the core portion of the optical fiber is placed at the middle position between the two positions determined in step (c), it is possible to accurately inject the entire bundle of laser beams into a restricted concentric region of the core portion which is located at the center of the core portion.

According to the second aspect of the present invention, it is also possible to accurately inject the entire bundle of laser beams into a restricted concentric region of the core portion which is located at the center of the core portion. Therefore, the startup time of the combined-laser-light source can be reduced.

That is, in the laser-light alignment method according to the second aspect of the present invention, the light intensity of the combined laser beams outputted from the light-emission end of the optical fiber is measured while moving the convergence lens in a direction perpendicular to the optical axis of the convergence lens so that the center of an area of the end face through which the laser beams emitted from the plurality of semiconductor lasers enter the optical fiber moves along a diameter passing through the center of the core portion. With the movement of the convergence lens, the light intensity measured as above monotonously increases to the maximum value, and monotonously decreases from the maximum value. The relationship between the light intensity and the position of the convergence lens shows a characteristic which is symmetric with respect to the position at which the light intensity is maximized. When the convergence lens is located in a position in which the light intensity is close to the maximum value, variations in the light intensity are small. However, when the convergence lens is located in a position in which the light intensity is substantially smaller than the maximum value, variations in the light intensity are great, and thus it is possible to accurately determine the two positions of the optical axis of the convergence lens at which the light intensity measured in step (b) is equal to a certain value which is smaller than the maximum value of the light intensity measured in step (b). Consequently, when the optical axis of the convergence lens is placed at the middle position between the two positions determined in step (c), it is possible to accurately inject the entire bundle of laser beams into a restricted concentric region of the core portion which is located at the center of the core portion.

In addition, when the combined-laser-light source is configured in such a manner that the laser beams to be combined do not spread wide, the effect of reducing the startup time of the combined-laser-light source is further enhanced.

According to the third aspect of the present invention, the converged bundle of the laser beams is incident on the area of an end face of the core which is concentric with the end face of the core, and has a diameter equal to or smaller than half of the diameter of the core. Therefore, the startup time of the combined-laser-light source can be reduced.

In addition, the startup times of the conventional combined-laser-light source using GaN semiconductor lasers are long. Therefore, in the case where the semiconductor lasers in the combined-laser-light source according to the third aspect of the present invention are GaN semiconductor lasers, the reduction of the startup time is particularly effective. Since the electro-optic conversion efficiency of the GaN semiconductor lasers is about 10%, and the electro-optic conversion efficiency of the other semiconductor lasers is about 30%, it is considered that the smaller electro-optic conversion efficiency of the GaN semiconductor lasers lengthens the startup time of the combined-laser-light source which uses the GaN semiconductor lasers.

In the case where the optical fiber in the combined-laser-light source according to the third aspect of the present invention is a multimode optical fiber, compared with the case where the optical fiber is a single-mode optical fiber, it is possible to further enhance the effect of reducing the startup time of the combined-laser-light source by injection of the converged bundle of the laser beams onto the area of the end face of the core which is concentric with the end face of the core and has a diameter equal to or smaller than half of the diameter of the core.

Since the exposure system according to the fourth aspect of the present invention comprises the combined-laser-light source according to the third aspect of the present invention, the startup time of the combined-laser-light source can be reduced. Therefore, it is possible to reduce the substantial operating time of the combined-laser-light source during operating time of the exposure system, and apparently lengthen the lifetime of the combined-laser-light source.

In addition, in the case where the image-forming optical system in the above exposure system comprises a microlens array comprised of a plurality of microlenses arrayed in correspondence with the plurality of light-modulation elements, respectively, so that the plurality of microlenses individually condense the respective portions of the bundle of laser beams combined in the optical fiber and optically modulated by and outputted from the plurality of light-modulation elements, it is possible to increase the utilization efficiency of the laser light, and operate the combined-laser-light source with lower output power. Therefore, the lifetime of the combined-laser-light source can be apparently lengthened.

DESCRIPTION OF THE DRAWINGS

FIG. 4 is a magnified plan view of optical elements constituting the combined-laser-light source of FIG. 1.

FIG. 6A is a diagram illustrating injection of the laser beams into the core of the optical fiber at a second alignment position.

FIG. 6B is a graph indicating a startup characteristic of the combined-laser-light source at the second alignment position.

FIG. 9A is a diagram illustrating injection of the laser beams into the core of the optical fiber at a fifth alignment position.

FIG. 9B is a graph indicating a startup characteristic of the combined-laser-light source at the fifth alignment position.

FIG. 10A is a diagram illustrating injection of the laser beams into the core of the optical fiber at a sixth alignment position.

FIG. 10B is a graph indicating a startup characteristic of the combined-laser-light source at the sixth alignment position.

FIG. 14 is a perspective view of an exposure system using combined-laser-light sources according to the present invention.

FIG. 15 is a schematic perspective view of a scanner portion of the exposure system of FIG. 14.

FIG. 19A is a perspective view of a light-source unit.

FIG. 19B is a magnified view of a laser-emission portion of the light-source unit of FIG. 19A.

FIG. 19C is a magnified front view of a first example of the laser-emission portion of the light-source unit of FIG. 19A, and indicates a first example of arrangement of optical fibers in the laser-emission portion.

FIG. 19D is a magnified front view of a second example of the laser-emission portion of the light-source unit of FIG. 19A, and indicates a second example of arrangement of optical fibers in the laser-emission portion.

DESCRIPTION OF PREFERRED EMBODIMENTS

An embodiment of the present invention is explained in detail below with reference to drawings.

Figure 1:
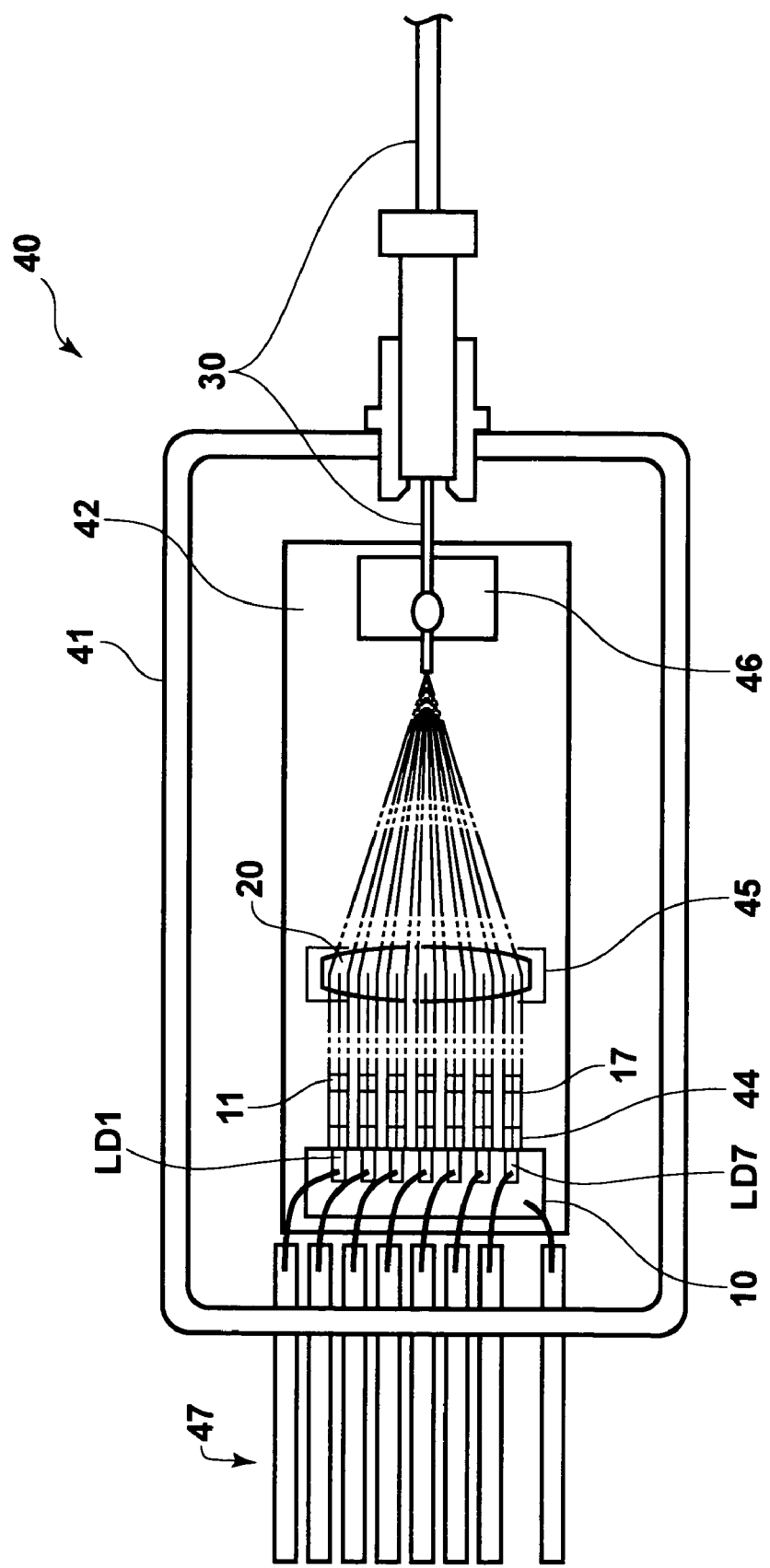
FIG. 1 is a plan view of a combined-laser-light source.
Figure 2:
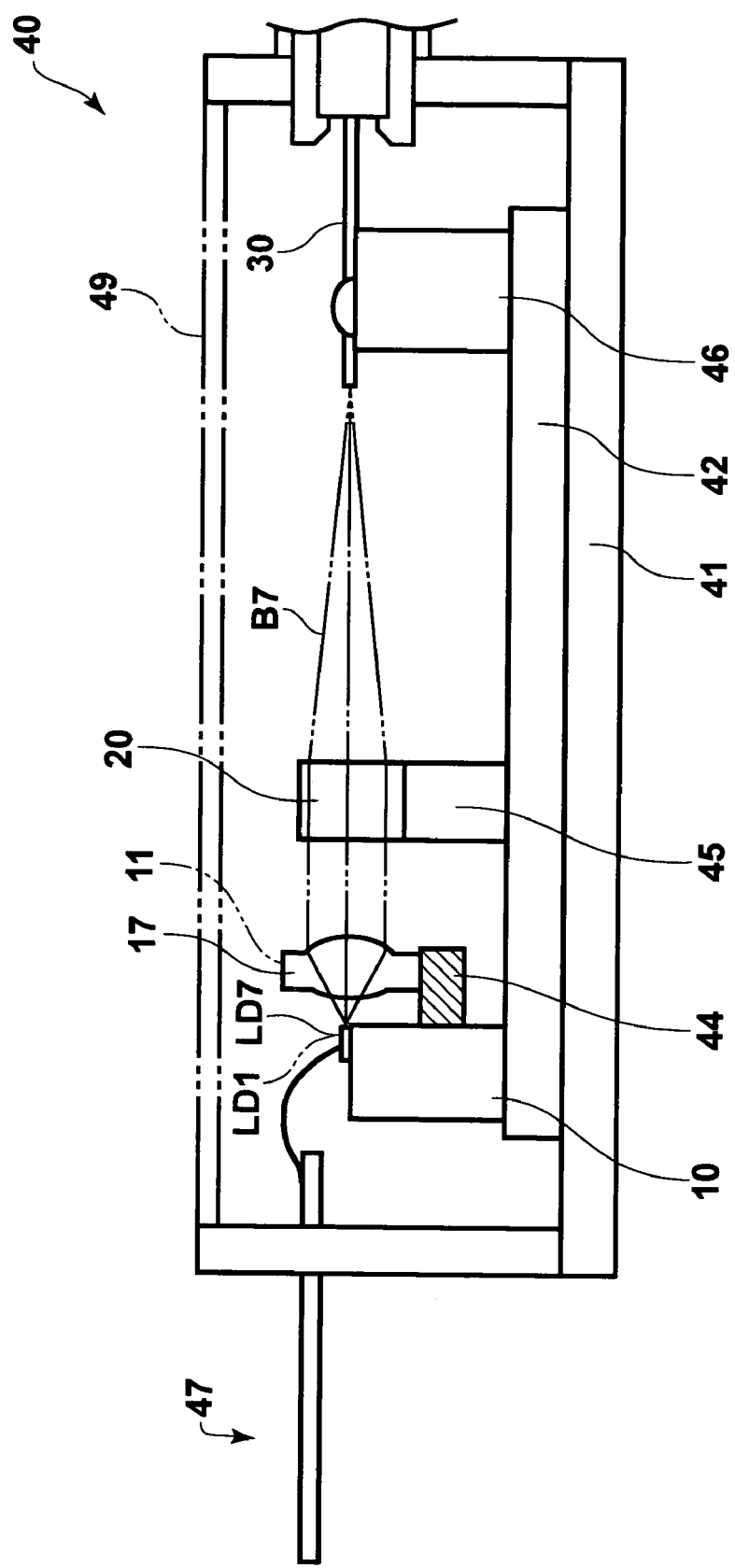
FIG. 2 is a side view of the combined-laser-light source of FIG. 1.
Figure 3:
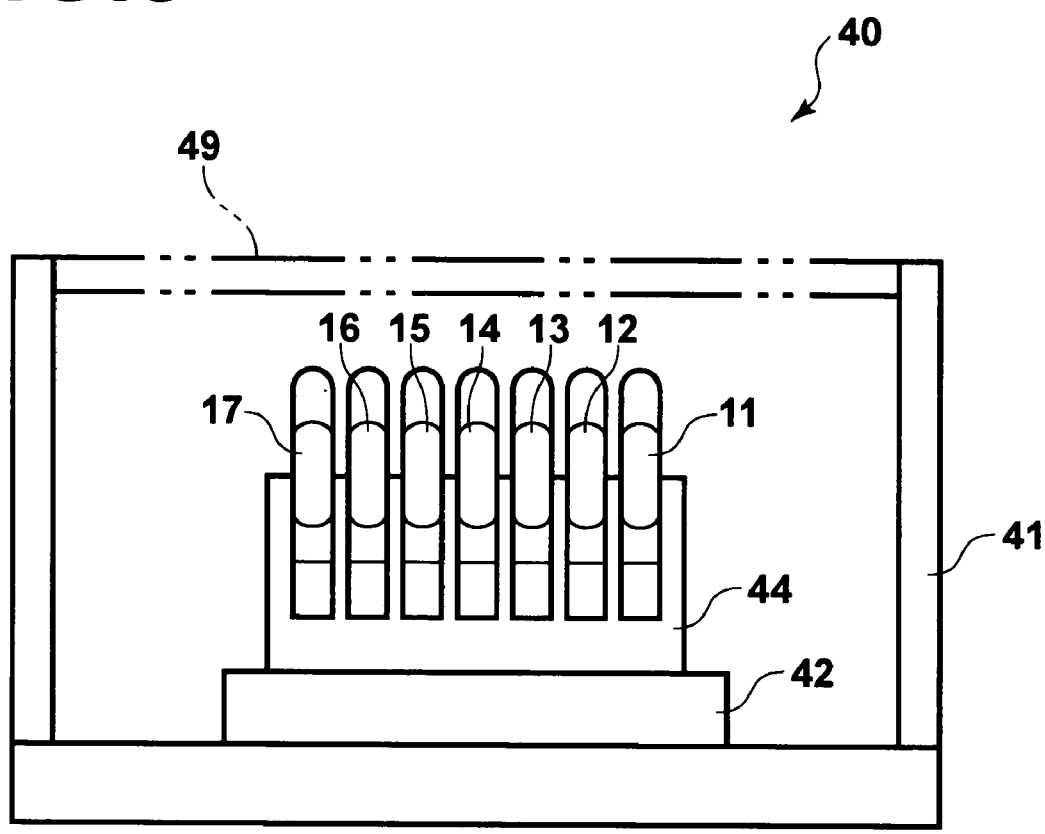
FIG. 3 is a front view of a portion of the laser module of FIG. 1.

First, a construction and operations of a combined-laser-light source according to an embodiment of the present invention are explained below with reference to FIGS. 1 through 4. FIG. 1 is a plan view of the combined-laser-light source according to an embodiment of the present invention, FIG. 2 is a side view of the combined-laser-light source of FIG. 1, FIG. 3 is a front view of a portion of the laser module of FIG. 1, and FIG. 4 is a magnified plan view of optical elements constituting the combined-laser-light source of FIG. 1. The combined-laser-light source illustrated in FIGS. 1 through 4 can be used as a light source, for example, in an exposure head in an exposure system which is explained later.

Construction of Combined-Laser-Light Source

As illustrated in FIG. 4, the combined-laser-light source 40 comprises a plurality of semiconductor lasers, an optical fiber 30, and a condensing lens 20. The condensing lens 20 is an optical system which converges an entire bundle of laser beams emitted from the semiconductor lasers so that the converged bundle of the laser beams BB enters the core of the optical fiber 30, and the laser beams are combined in the multimode optical fiber 30 and outputted through the optical fiber 30.

Specifically, the above semiconductor lasers are single- or multiple-transverse-mode GaN-based semiconductor lasers in the form of a chip. Although, generally, the combined-laser-light source 40 may contain any number of semiconductor lasers, in FIGS. 1 through 4, the number of the semiconductor lasers is assumed to be seven as an example, and the semiconductor lasers bear the references LD1 through LD7. The GaN-based semiconductor lasers LD1 through LD7 are arranged along a direction and fixed on a heat block 10, which is made of a material having a high thermal expansion coefficient such as copper. In addition, in order to collimate the laser beams emitted from the GaN-based semiconductor lasers LD1 through LD7, collimator lenses 11 through 17 are arranged in correspondence with the GaN-based semiconductor lasers LD1 through LD7, respectively. The condensing lens 20 makes the entire bundle of the collimated laser beams converge onto a point.

The optical fiber 30 is, for example, a multimode optical fiber. For example, even when the number of the semiconductor lasers is twenty, it is possible to make a bundle of laser beams emitted from the twenty semiconductor lasers enter a multimode optical fiber having a cladding diameter of 125 micrometers, a core diameter of 50 micrometers, and a numerical aperture (NA) of 0.2.

The GaN-based semiconductor lasers LD1 through LD7 have an identical oscillation wavelength and an identical maximum output power. For example, the oscillation wavelength is 405 nm, and the maximum output power is 100 mW in the case where the GaN-based semiconductor lasers LD1 through LD7 are multimode semiconductor lasers, and 30 mW in the case where the GaN-based semiconductor lasers LD1 through LD7 are single-mode semiconductor lasers. Further, the oscillation wavelength is not limited to 405 nm, and the GaN-based semiconductor lasers LD1 through LD7 may have any oscillation wavelength in the range of 350 to 450 nm.

As illustrated in FIGS. 1, 2, and 3, the above combined-laser-light source is contained in a box type package 41 together with other optical elements. The package 41 has an opening on its upper side, and is provided with a cover 49, which is produced so that the opening of the package 41 can be closed with the cover 49. When sealing gas is introduced after degassing, and the opening is closed with the cover 49, the above combined-laser-light source is hermetically sealed in the closed space (sealed space) which is realized by the package 41 and the cover 49.

A base plate 42 is fixed on the inner bottom surface of the package 41. The aforementioned heat block 10, a condensing-lens holder 45 for holding the condensing lens 20, and a fiber holder 46 for holding the light-entrance end of the multimode optical fiber 30 are fixed to the upper surface of the base plate 42. The light-emission end portion of the combined-laser-light source is led out of the package 41 through an opening formed in a wall of the package 41.

Although not shown, the temperature of the base plate 42 is controlled with a Peltier element, a temperature control means using a fluid (gas or liquid) as a medium, or the like so that the temperature of the combined-laser-light source is maintained constant while the exposure system is in operation.

In addition, a collimator-lens holder 44 for holding the collimator lenses 11 through 17 is attached to a side wall of the heat block 10. Further, wirings 47 for supplying driving currents to the GaN-based semiconductor lasers LD1 through LD7 are led out of the package 41 through openings formed in a wall of the package 41.

In FIGS. 1 and 2, in order to simplify the illustration, the reference numbers of the GaN-based semiconductor lasers LD2 to LD6 and the collimator lenses 12 through 16 are not shown.

FIG. 3 is a front view of a portion of the laser module of FIG. 1 in which the collimator lenses 11 through 17 are attached to the collimator-lens holder 44. Each of the collimator lenses 11 through 17 is formed to have an elongated shape which is obtained by cutting an aspherical lens with parallel planes so as to leave a portion containing the optical axis of the aspherical lens. The collimator lenses 11 through 17 can be formed, for example, by molding from resin or glass. The collimator lenses 11 through 17 are closely arranged in the direction along which the light-emission points of the GaN-based semiconductor lasers LD1 through LD7 are aligned (i.e., in the horizontal direction in FIG. 3) so that the length directions of the collimator lenses 11 through 17 are perpendicular to the direction along which the light-emission points are aligned.

Each of the GaN-based semiconductor lasers LD1 to LD7 comprises an active layer having an emission width of 2 micrometers. For example, the spread angle of each of laser beams B1 through B7 emitted from the GaN-based semiconductor lasers LD1 to LD7 is 10 degrees in the direction parallel to the active layer and 30 degrees in the direction perpendicular to the active layer.

The GaN-based semiconductor lasers LD1 to LD7 are arranged so that the light-emission points of the GaN-based semiconductor lasers LD1 to LD7 are aligned along a line parallel to the active layers of the GaN-based semiconductor lasers LD1 to LD7. Therefore, the laser beams B1 through B7 emitted from the GaN-based semiconductor lasers LD1 to LD7 respectively enter the collimator lenses 11 through 17 so that the direction of the greater spread angle of each of the laser beams B1 through B7 coincides with the length direction of each of the collimator lenses 11 through 17, and the direction of the smaller spread angle of each of the laser beams B1 through B7 coincides with the width direction of each of the collimator lenses 11 through 17 (which is perpendicular to the length direction).

In this example, each of the collimator lenses 11 through 17 has a length of 4.6 mm and a width of 1.1 mm, and the beam diameter of each of the laser beams B1 through B7 is 2.6 mm in the major-axis direction and 0.9 mm in the minor-axis direction. In addition, each of the collimator lenses 11 through 17 has a focal length of 3 mm and a numerical aperture (NA) of 0.6, and the collimator lenses 11 through 17 are arranged with a pitch of 1.25 mm.

The condensing lens 20 has a shape which is obtained by cutting an aspherical lens along two parallel planes so as to leave an elongated portion containing the optical axis of the aspherical lens. Thus, the condensing lens 20 is elongated in the direction along which the collimator lenses 11 through 17 are arranged, and has a small dimension in the direction perpendicular to the direction along which the collimator lenses 11 through 17 are arranged. The condensing lens 20 has a focal length of 23 mm and a numerical aperture (NA) of 0.2. The condensing lens 20 can be formed, for example, by molding from resin or glass.

Operation of Combined-Laser-Light Source

Operations of the combined-laser-light source 40 are explained below.

The laser beams B1 through B7 emitted from the GaN-based laser-diode chips LD1 through LD7 in the combined-laser-light source 40 are respectively collimated by the corresponding collimator lenses 11 through 17. The collimated laser beams B1 through B7 are collected by the condensing lens 20, and incident on the light-entrance end face of the core 30a of the aforementioned multimode optical fiber 30 in the combined-laser-light source. Thus, the laser beams B1 through B7 collected by the condensing lens 20 as above enter and propagate in the core 30a of the multimode optical fiber 30, in which the laser beams B1 through B7 are combined (optically multiplexed) into a single laser beam B. Then, the laser beam B is outputted from the above multimode optical fiber 30, and enters another optical fiber 31 which is coupled to the multimode optical fiber 30 and explained later.

In the case where the coupling efficiency of the laser beams B1 through B7 to the multimode optical fiber 30 is 0.85, and the output power of each of the GaN-based laser-diode chips LD1 through LD7 is 30 mW, the output power of combined laser beam B becomes 180 mW (=30 mW×0.85×7). The combined laser beam B propagates through the optical fiber 31. Thus, in the case where the exposure system explained later comprises six laser sources units each containing the combined-laser-light source 40 and the optical fiber 31 coupled to the combined-laser-light source 40, and the six optical fibers 31 are bundled in a laser-emission portion 61, the total output power from the laser-emission portion 61 becomes about 1 W (=180 mW×6).

When the focal length and the numerical aperture of each of the collimator lenses 11 through 17 are indicated by $f_1$ and $NA_1$, the focal length of the condensing lens 20 is indicated by $f_2$, the numerical aperture of the multimode optical fiber 30 is indicated by $NA_2$, the space utilization efficiency is indicated by $\eta$, and the number of the light beams to be combined is indicated by N, the magnification power M of the lens system, i.e., the ratio of the dimension of the convergent spot which each of the laser beams B1 through B7 forms on the end face the core 30a of the multimode optical fiber 30 to the dimension of the light emission spot (the active layer of each of the GaN-based semiconductor lasers LD1 through LD7) is expressed by the following equation.

$$M=f_2/f_1=NA_1/(NA_2/n\times\eta)=NA_1/NA_2\times n/\eta$$

In the above equation, the space utilization efficiency $\eta$ is defined as a ratio of the sum of the spaces occupied by the respective laser beams B1 through B7 to the continuous space containing the entire bundle of the laser beams B1 through B7 (i.e., the space between and including the light beams B1 and B7). Therefore, when the optical paths of the seven laser beams B1 through B7 abut each other, $\eta=1$.

The above equation indicates that the magnification power M decreases with increase in the space utilization efficiency $\eta$. In addition, since the displacement of each of the laser beams B1 through B7 on the end face of the core 30a of the multimode optical fiber 30 caused by misalignment between the GaN-based semiconductor lasers LD1 through LD7, the condensing lens 20, and the multimode optical fiber 30 decreases with the magnification power M, the accuracy in the combining of the light beams increases as the magnification power M decreases.

Startup Characteristics of Combined-Laser-Light Source

The combined-laser-light source 40 has such a construction that the entire bundle of laser beams BB are incident on an area of the end face of the core in a condition in which the temperature of the combined-laser-light source 40 is steadily controlled, where the area is concentric with the end face of the core, and has a diameter equal to or smaller than half of the diameter of the core. Therefore, the startup time of the combined-laser-light source 40 can be reduced.

Hereinbelow, concrete examples of the reduction of the startup time in the combined-laser-light source 40 according to the present invention and comparison examples of conventional combined-laser-light sources are explained with reference to FIGS. 5A through 10B. In FIGS. 5A through 10B, the same elements and constituents (including the aforementioned core 30a, the laser beams B1 through B7, the base plate 42, and a concentric area 30b explained later) are indicated by the same reference numbers.

FIGS. 5A, 6A, 7A, 8A, 9A, and 10A show areas of the end face of the core 30a through which the incident laser beams B1 through B7 enter the core 30a when the temperature of the combined-laser-light source is steadily controlled. In FIGS. 5A, 6A, 7A, 8A, 9A, and 10A, the above areas of the end face of the core 30a are indicated by the references E5 through E10, respectively. In addition, the concentric area 30b is an area of the end face of the core 30a which is concentric to the end face of the core 30a and has a diameter equal to or smaller than half of the diameter of the core 30a.

FIGS. 5B, 6B, 7B, 8B, 9B, and 10B are graphs indicating startup characteristics F5 through F10 of combined-laser-light sources which are constructed so that the laser beams B1 through B7 enter the core 30a as illustrated in FIGS. 5A, 6A, 7A, 8A, 9A, and 10A, respectively. In each of FIGS. 5B, 6B, 7B, 8B, 9B, and 10B, the ordinate P indicates the output power of each combined-laser-light source, and the abscissa T indicates time (second) elapsed since powering on of semiconductor lasers in the combined-laser-light source, the time at which the semiconductor lasers are powered on corresponds to the time "0," the output power is normalized so that the rated output of each combined-laser-light source is equal to one, and the rated tolerance range of the output power is indicated by H.

Concrete Example 1

Figures 5A, 5B:
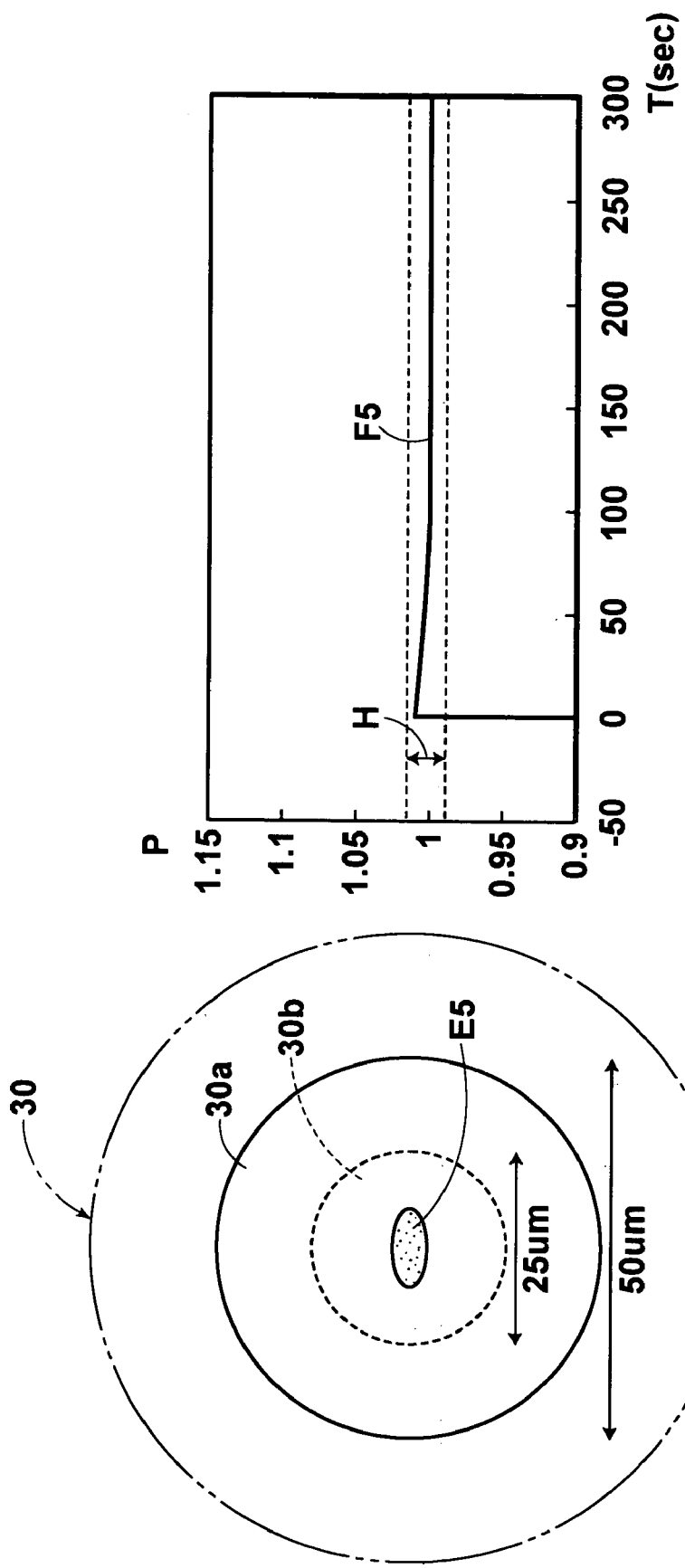
FIG. 5A is a diagram illustrating injection of laser beams into a core of an optical fiber at a first alignment position.
FIG. 5B is a graph indicating a startup characteristic of the combined-laser-light source at the first alignment position.

As illustrated in FIG. 5A, the combined-laser-light source in the concrete example 1 is constructed in such a manner that the laser beams B1 through B7 are incident on the very small central area E5 in the aforementioned concentric area 30b (having the diameter equal to or smaller than the diameter of the core 30a) when the temperature of the combined-laser-light source is steadily controlled. Since the laser beams B1 through B7 are incident on the identical area, only the single area E5 is illustrated in FIG. 5A.

FIG. 5B shows the startup characteristic F5 of the above combined-laser-light source. As indicated in FIG. 5B, the output power of the combined-laser-light source enters the rated tolerance range H immediately after the powering on of the semiconductor lasers. That is, even when the semiconductor lasers are powered off and are then powered on, the output of the combined-laser-light source can be used immediately after (e.g., within one second of) the powering on of the semiconductor lasers.

Concrete Example 2

As illustrated in FIG. 6A, the combined-laser-light source in the concrete example 2 is constructed in such a manner that the laser beams B1 through B7 are incident on the areas E6 in the aforementioned concentric area 30b (having the diameter equal to or smaller than the diameter of the core 30a) when the temperature of the combined-laser-light source is steadily controlled, where the areas E6 are located approximately in the upper half of the concentric area 30b. Since the incident laser beams B1 through B7 are spread, the areas E6 on which the laser beams B1 through B7 are incident are spread as illustrated in FIG. 6A.

FIG. 6B shows the startup characteristic F6 of the above combined-laser-light source. Similar to the concrete example 1, the output power of the combined-laser-light source enters the rated tolerance range H immediately after the powering on of the semiconductor lasers, as indicated in FIG. 6B. That is, even when the semiconductor lasers are powered off and are then powered on, the output of the combined-laser-light source can be used immediately after (e.g., within one second of) powering on of the semiconductor lasers.

Comparison Example 1

Figures 7A, 7B:
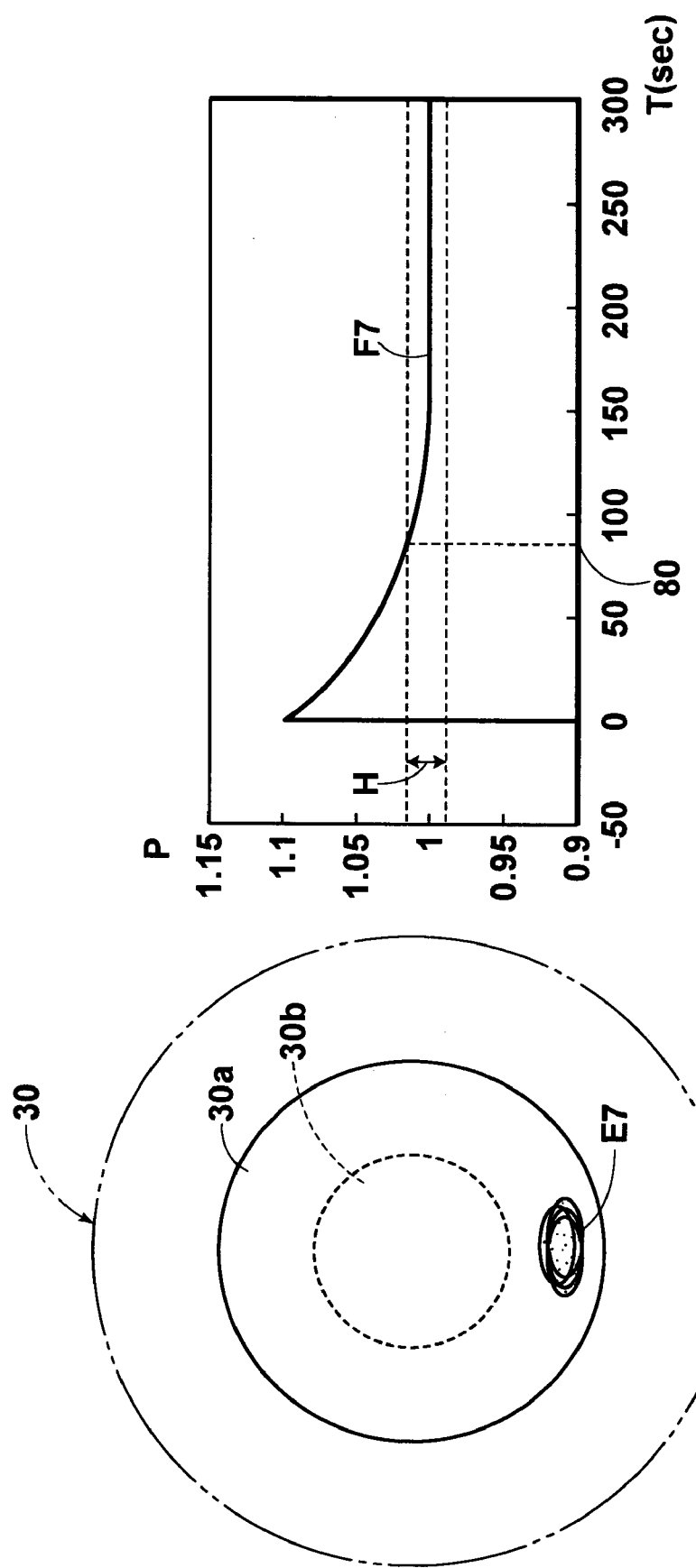
FIG. 7A is a diagram illustrating injection of the laser beams into the core of the optical fiber at a third alignment position.
FIG. 7B is a graph indicating a startup characteristic of the combined-laser-light source at the third alignment position.

As illustrated in FIG. 7A, the combined-laser-light source in the comparison example 1 is constructed in such a manner that the laser beams B1 through B7 are incident on the areas E7 in the end face of the core 30a when the temperature of the combined-laser-light source is steadily controlled, where the areas E7 are located outside (on the lower side of) the concentric area 30b (having the diameter equal to or smaller than the diameter of the core 30a). As illustrated in FIG. 7A, the spread of the areas E7 on which the laser beams B1 through B7 are incident are small.

FIG. 7B shows the startup characteristic F7 of the above combined-laser-light source. The output power of the combined-laser-light source greatly deviates to higher values from the rated tolerance range H immediately after powering on of the semiconductor lasers, as indicated in FIG. 7B. When about 80 seconds elapse since the powering on, the output power of the combined-laser-light source enters the rated tolerance range H. Therefore, when the semiconductor lasers are powered off and are then powered on, the output of the combined-laser-light source cannot be used immediately after the powering on of the semiconductor lasers, and it is necessary to wait about 80 seconds until the combined-laser-light source becomes usable. Thus, if the combined-laser-light source in the comparison example 1 is used in the exposure system explained later, the operations of the exposure system can be interfered by repetition of powering on and off of the semiconductor lasers.

Comparison Example 2

Figures 8A, 8B:
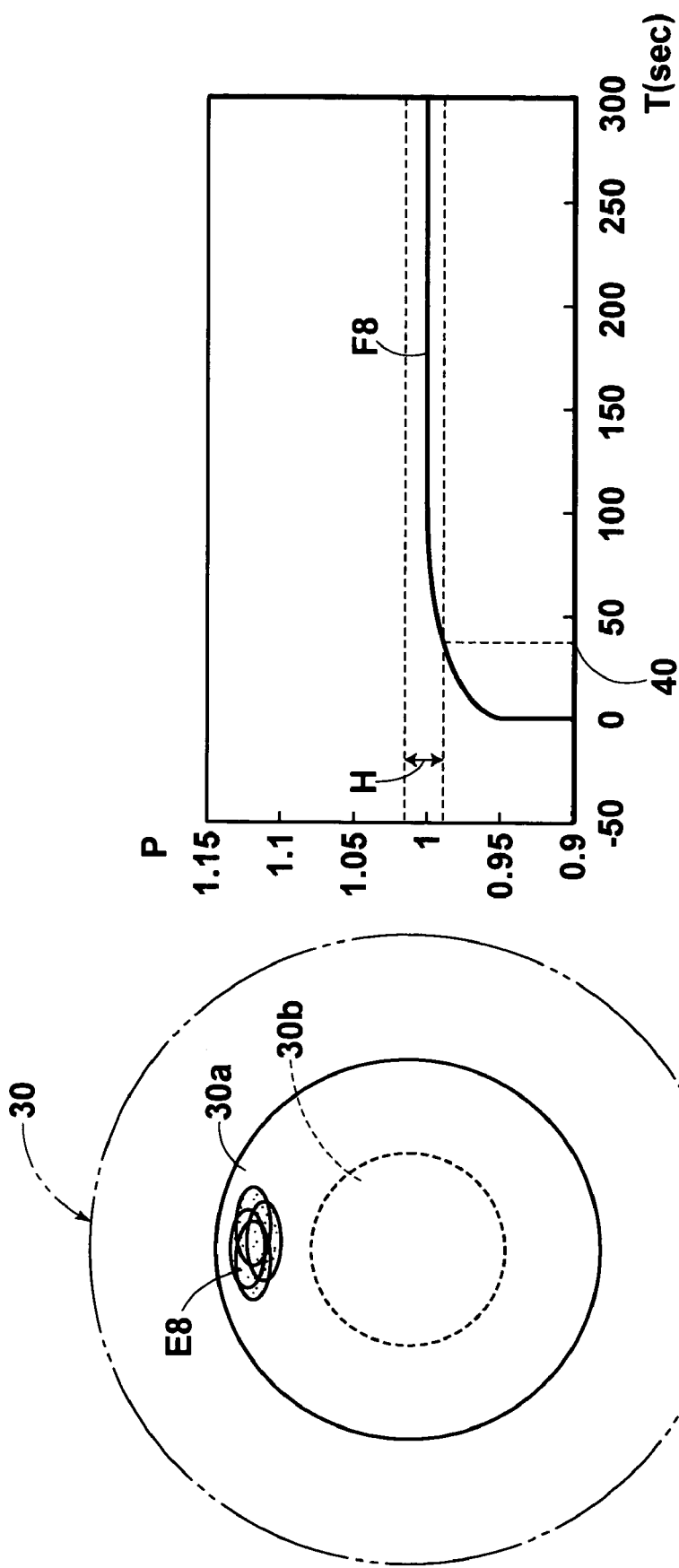
FIG. 8A is a diagram illustrating injection of the laser beams into the core of the optical fiber at a fourth alignment position.
FIG. 8B is a graph indicating a startup characteristic of the combined-laser-light source at the fourth alignment position.

As illustrated in FIG. 8A, the combined-laser-light source in the comparison example 2 is constructed in such a manner that the laser beams B1 through B7 are incident on the areas E8 in the end face of the core 30a when the temperature of the combined-laser-light source is steadily controlled, where the areas E8 are located outside (on the upper side of) the concentric area 30b (having the diameter equal to or smaller than the diameter of the core 30a). As illustrated in FIG. 8A, the spread of the areas E8 on which the laser beams B1 through B7 are incident are small.

FIG. 8B shows the startup characteristic F8 of the above combined-laser-light source. The output power of the combined-laser-light source greatly is lower than the rated tolerance range H immediately after powering on of the semiconductor lasers, as indicated in FIG. 8B. When about 40 seconds elapse since the powering on, the output power of the combined-laser-light source enters the rated tolerance range H. Therefore, when the semiconductor lasers are powered off and are then powered on, the output of the combined-laser-light source cannot be used immediately after the powering on of the semiconductor lasers, and it is necessary to wait about 40 seconds until the combined-laser-light source becomes usable. Thus, if the combined-laser-light source in the comparison example 2 is used in the exposure system explained later, the operations of the exposure system can be interfered by repetition of powering on and off of the semiconductor lasers.

Concrete Example 3

As illustrated in FIG. 9A, the combined-laser-light source in the concrete example 3 is constructed in such a manner that the laser beams B1 through B7 are incident on the areas E9 in the aforementioned concentric area 30b (having the diameter equal to or smaller than the diameter of the core 30a) when the temperature of the combined-laser-light source is steadily controlled, where the areas E9 are located approximately in the lower half of the concentric area 30b. Since the incident laser beams B1 through B7 are spread, the areas E9 on which the laser beams B through B7 are incident are spread as illustrated in FIG. 9A.

FIG. 9B shows the startup characteristic F9 of the above combined-laser-light source. As illustrated in FIG. 9B, the output power of the combined-laser-light source enters the rated tolerance range H immediately after (e.g., within one second of) powering on of the semiconductor lasers. That is, even when the semiconductor lasers are powered off and are then powered on, the output of the combined-laser-light source can be used immediately after the powering on of the semiconductor lasers.

The combined-laser-light source in the concrete example 3 is assembled in a condition in which the temperature of the base plate 42 is steadily controlled at 30¼ C, and the startup characteristic F9 of the combined-laser-light source has been obtained in the same condition.

Comparison Example 3

FIG. 10A shows that the combined-laser-light source in the comparison example 3 is constructed in such a manner that the laser beams B through B7 are incident on the areas E10 in the aforementioned concentric area 30b (having the diameter equal to or smaller than the diameter of the core 30a) when the temperature of the combined-laser-light source is steadily controlled, where the areas E10 are located approximately in the lower half of the concentric area 30b. Since the incident laser beams B1 through B7 are spread, the areas E10 on which the laser beams B1 through B7 are incident are spread as illustrated in FIG. 10A.

The combined-laser-light source in the comparison example 3 is assembled in a first condition in which the temperature of the base plate 42 is steadily controlled at 30¼ C. Thereafter, the temperature of the base plate 42 is lowered to 10¼ C, and the startup characteristic F10 of the combined-laser-light source has been measured in a second condition which is different from the first condition in which the combined-laser-light source is assembled.

FIG. 10B shows the startup characteristic F10 of the combined-laser-light source in the comparison example 3 measured as above. When the combined-laser-light source in the comparison example 3 is powered on under the second condition different from the first condition in which the combined-laser-light source is assembled, the output power of the combined-laser-light source deviates to higher values from the rated tolerance range H immediately after powering on of the semiconductor lasers, as indicated in FIG. 10B. When about 30 seconds elapse since the powering on, the output power of the combined-laser-light source enters the rated tolerance range H. Therefore, when the semiconductor lasers are powered off and are then powered on in the above second condition, the output of the combined-laser-light source cannot be used immediately after the powering on of the semiconductor lasers, and it is necessary to wait about 30 seconds until the combined-laser-light source becomes usable. Thus, if the combined-laser-light source in the comparison example 3 is used in the exposure system explained later, the operations of the exposure system can be interfered by repetition of powering on and off of the semiconductor lasers.

Laser-Light Alignment Method

Laser-light alignment methods which can be used in the combined-laser-light source 40 according to the present invention are explained below with reference to FIG. 4.

That is, the light intensity of the combined laser beams B outputted from the light-emission end 30E of the multimode optical fiber 30 is measured while steadily controlling the temperature of the combined-laser-light source 40 and moving the light-entrance end 30D of the multimode optical fiber 30 in a direction Q1 parallel to the end face 30H at the light-entrance end 30D so that the injection center R of the entire bundle of laser beams BB (i.e., the center R of an area of the end face 30H through which the entire bundle of laser beams BB enters the multimode optical fiber 30) moves along a diameter passing through the center of the end face of the core 30a. Then, two positions J1 and J2 of the central axis Ja of the end face of the core 30a at which the light intensity measured as above is equal to a certain value which is smaller than the maximum value of the measured light intensity are determined. Hereinafter, the central axis of the end face of the core is referred to as a central core axis. Then, the core-center axis Ja of the multimode optical fiber 30 is placed at the middle position between the two positions J1 and J2 determined as above. Thus, it is possible to make the entire bundle of laser beams incident on an area in the concentric area 30b, which is located at the center of the end face 30H of the core 30a.

Figure 11:
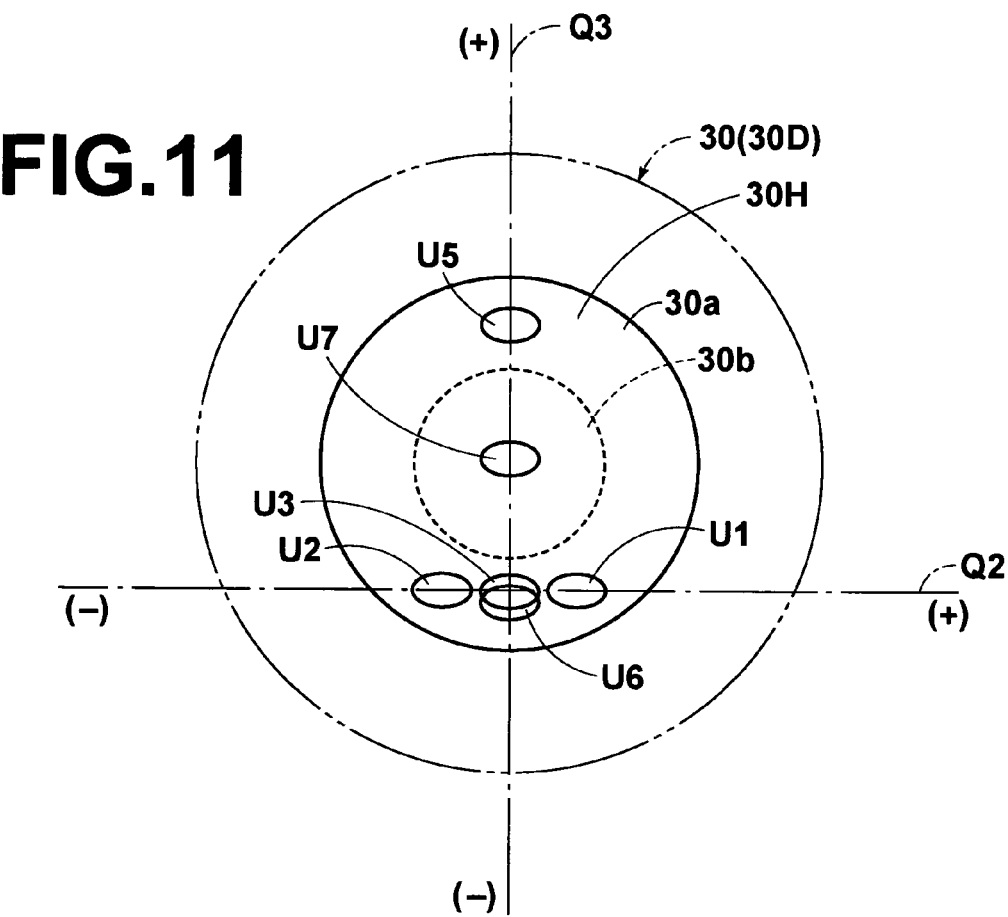
FIG. 11 is a diagram illustrating injection positions of laser beams on the end face of the optical fiber.

Specifically, when the above laser-light alignment method is performed, it is necessary to adjust alignment along at least two axis directions. Hereinbelow, operations for adjusting alignment in two axis directions are explained with reference to FIGS. 4, 11, 12, and 13. FIG. 11 shows injection positions of the laser beams on the end face of the optical fiber, FIG. 12 shows a relationship between the position of the core-center axis of the optical fiber and the total light intensity of the combined laser beams B outputted from the light-emission end 30E of the multimode optical fiber 30 (the coupling efficiency of the entire bundle of laser beams to the optical fiber), in the first alignment step, and FIG. 13 shows a relationship between the position of the core-center axis of the optical fiber and the total light intensity of the combined laser beams B outputted from the light-emission end 30E of the multimode optical fiber 30 (the coupling efficiency of the entire bundle of laser beams to the optical fiber), in the second alignment step.

First, in the first alignment step, the light intensity of the combined laser beams B outputted from the light-emission end 30E of the multimode optical fiber 30 is measured while steadily controlling the temperature of the combined-laser-light source 40 and moving the light-entrance end 30D of the multimode optical fiber 30 along the axis Q2 which is parallel to the end face 30H at the light-entrance end 30D. Then, two positions J11 and J12 of the core-center axis of the multimode optical fiber 30 at which the light intensity measured as above is equal to a certain value which is smaller than the maximum value of the measured light intensity are determined (as indicated in FIG. 12), and the core-center axis Ja of the multimode optical fiber 30 is placed at the middle position J13 between the two positions J11 and J12 determined as above. That is, in the first alignment step, the light-entrance end 30D of the multimode optical fiber 30 is moved so that the injection center R of the entire bundle of laser beams BB (i.e., the center R of an area of the end face 30H through which the entire bundle of laser beams BB enters the multimode optical fiber 30) does not pass through the center of the end face of the core 30a.

Figure 12:
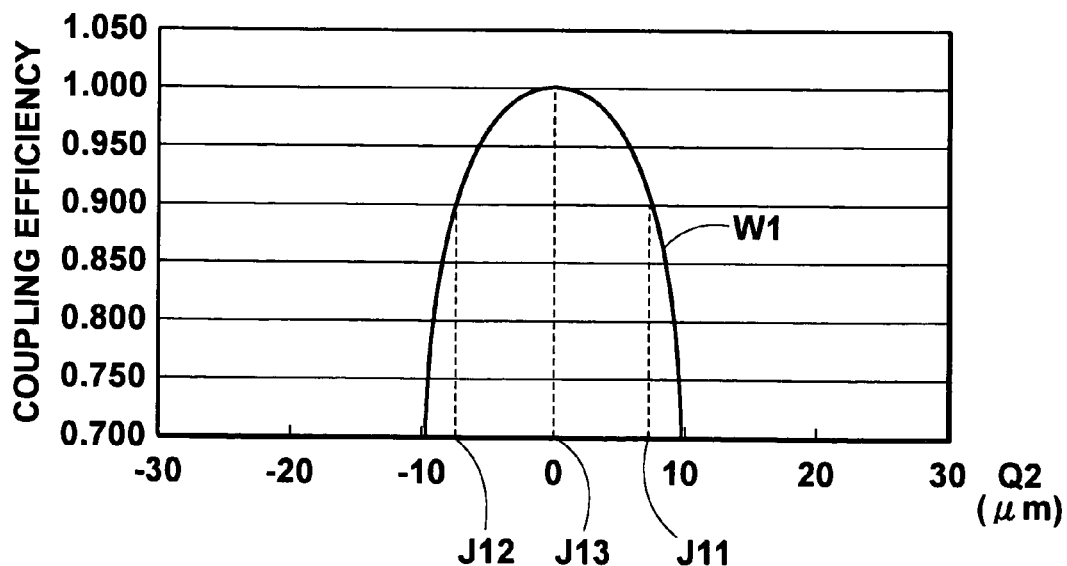
FIG. 12 is a graph indicating a relationship between the position of the core-center axis of the optical fiber and the coupling efficiency of the entire bundle of laser beams to the optical fiber, in a first alignment step.
Figure 13:
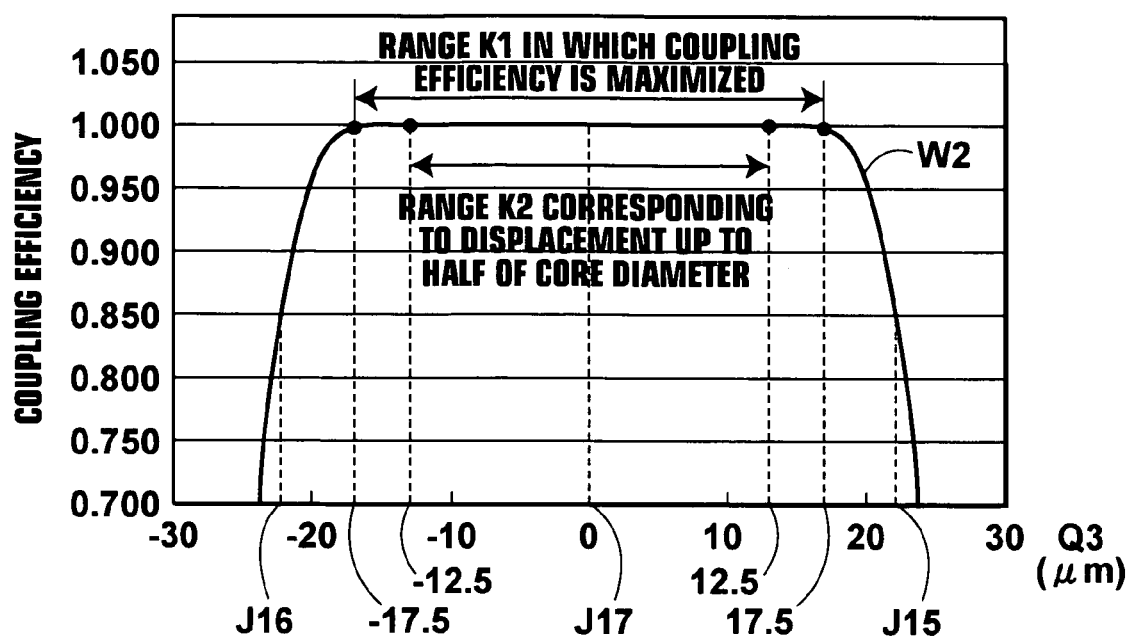
FIG. 13 is a graph indicating a relationship between the position of the core-center axis of the optical fiber and the coupling efficiency of the entire bundle of laser beams to the optical fiber, in a second alignment step.

As indicated by the curve W1 in FIG. 12, in the relationship between the position of the core-center axis of the optical fiber and the total light intensity of the combined laser beams B outputted from the light-emission end 30E of the multimode optical fiber 30 (the coupling efficiency of the entire bundle of laser beams to the optical fiber) in the first alignment step, the coupling efficiency becomes an identical value when the core-center axis Ja at the light-entrance end 30D is placed at the positions J11 and J12, and is maximized when the core-center axis Ja at the light-entrance end 30D is placed at the middle position J13. As illustrated in FIG. 11, when the core-center axis Ja at the light-entrance end 30D is placed at the positions J11 and J12, the injection center R of the entire bundle of laser beams BB incident on the end face 30H is located at the positions U1 and U2 on the axis Q2, respectively. In addition, when the core-center axis Ja at the light-entrance end 30D is placed at the middle position J13, the injection center R of the entire bundle of laser beams BB incident on the end face 30H is located at the position U3 on the axis Q2.

Next, in the second alignment step, the light intensity of the combined laser beams B outputted from the light-emission end 30E of the multimode optical fiber 30 is measured while moving the core-center axis at the light-entrance end 30D of the multimode optical fiber 30 along the axis Q3 which contains the above position J13 between the positions J11 and J12, and is parallel to the end face 30H at the light-entrance end 30D and perpendicular to the axis Q2 (along which the light-entrance end 30D is moved in the first alignment step). At this time, the light-entrance end 30D of the multimode optical fiber 30 is moved so that the injection center R of the entire bundle of laser beams BB (i.e., the center R of an area of the end face 30H through which the entire bundle of laser beams BB enters the multimode optical fiber 30) passes through the center of the end face of the core 30a. Then, two positions J15 and J16 of the core-center axis of the multimode optical fiber 30 at which the light intensity measured as above is equal to a certain value which is smaller than the maximum value of the measured light intensity (for example, 80% of the maximum value) are determined (as indicated in FIG. 13), and the core-center axis Ja of the multimode optical fiber 30 is placed at the middle position J17 between the two positions determined as above. That is, in the second alignment step, the injection center R of the entire bundle of laser beams BB can be placed at the center of the end face of the core 30a. Thus, it becomes possible to make the entire bundle of laser beams incident on the concentric area 30b, which is located at the center of the end face at the light-entrance end 30D, and the operations for alignment are completed.

As indicated by the curve W2 in FIG. 13, in the relationship between the position of the core-center axis of the optical fiber and the total light intensity of the combined laser beams B outputted from the light-emission end 30E of the multimode optical fiber 30 (the coupling efficiency of the entire bundle of laser beams to the optical fiber) in the second alignment step, the coupling efficiency becomes an identical value when the core-center axis Ja at the light-entrance end 30D is placed at the positions J15 and J16, and is maximized when the core-center axis Ja at the light-entrance end 30D is placed at the middle position J17. FIG. 13 shows that the range K1 of the position of the core-center axis Ja in which the coupling efficiency is maximized is greater than the range K2 of the position of the core-center axis Ja in which the displacement of the core-center axis Ja from the injection center R of the entire bundle of laser beams BB is equal to or smaller than half of the diameter of the core 30a. As illustrated in FIG. 11, when the core-center axis Ja at the light-entrance end 30D is placed at the positions J15 and J16, the injection center R of the entire bundle of laser beams BB incident on the end face 30H is located at the positions U5 and U6 on the axis Q3, respectively. In addition, when the core-center axis Ja at the light-entrance end 30D is placed at the middle position J17, the injection center R of the entire bundle of laser beams BB incident on the end face 30H is located at the position U7 on the axis Q3, i.e., within the concentric area 30b in the end face 30H of the core 30a, where the concentric area 30b has a diameter which is equal to or smaller than half of the diameter of the core 30a.

In the case where alignment is adjusted so that the injection center R of the entire bundle of laser beams BB incident on the end face 30H is located within the concentric area 30b in the end face 30H of the core 30a, e.g., at the position U7 indicated in FIG. 11, it is possible to reduce the startup time of the combined-laser-light source, compared with the case where alignment is adjusted so that the injection center R is located outside the concentric area 30b, e.g., at the position U3 indicated in FIG. 11.

As indicated by each of the curves W1 and W2, with the movement of the core-center axis Ja at the light-entrance end 30D of the optical fiber, the total light intensity of the combined laser beams B outputted from the light-emission end 30E of the multimode optical fiber 30 (the coupling efficiency of the entire bundle of laser beams to the optical fiber) monotonously increases to the maximum value, and monotonously decreases from the maximum value. The relationship between the light intensity and the position of the core-center axis Ja at the light-entrance end 30D of the optical fiber shows a characteristic which is symmetric with respect to the position at which the light intensity is maximized. Therefore, when the core-center axis Ja at the light-entrance end 30D is located in a position in which the light intensity is close to the maximum value, variations in the light intensity are small. However, when the core-center axis Ja at the light-entrance end 30D is located in a position in which the light intensity is substantially smaller than the maximum value, variations in the light intensity caused by movement of the core-center axis Ja are great, and therefore it is possible to accurately determine the aforementioned two positions of the core-center axis of the optical fiber. Thus, it is possible to adjust alignment so that the injection center R of the entire bundle of laser beams is accurately located within the concentric area 30b.

As explained above, the light intensity of the entire bundle of laser beams outputted from the light-emission end of the optical fiber is measured while moving the light-entrance end of the optical fiber, two positions of the light-entrance end at which the measured light intensity is equal to a certain value which is smaller than the maximum value of the measured light intensity are determined, and the core-center axis of the optical fiber is placed at the middle axis position between axis positions of the core-center axis at which the measured light intensity is equal to the certain value in such a manner that the core-center axis in the middle axis position is parallel to the core-center axis in the two axis positions. Therefore, accurate alignment is enabled.

Alternatively, alignment can be adjusted in the following way.

That is, the light intensity of the combined laser beams B outputted from the light-emission end 30E of the multimode optical fiber 30 is measured while steadily controlling the temperature of the combined-laser-light source 40 and moving the optical axis of the condensing lens 20 in the direction Q1' perpendicular to the optical axis of the condensing lens 20 so that the injection center R of the entire bundle of laser beams BB (i.e., the center R of an area of the end face 30H through which the entire bundle of laser beams BB enters the multimode optical fiber 30) moves along a diameter passing through the center of the end face of the core 30a. Then, two positions J5 and J6 of the core axis Jb of the condensing lens 20 at which the light intensity measured as above is equal to a certain value which is smaller than the maximum value of the measured light intensity are determined, and the core axis Jb of the condensing lens 20 is placed at the middle position between the two positions J5 and J6 determined as above. Thus, it is possible to make the entire bundle of laser beams incident on an area in the concentric area 30b, which is located at the center of the end face 30H of the core 30a.

In the case where alignment is adjusted by moving the optical fiber, a mechanism for adjusting the alignment can be realized by a relatively simple construction. However, in order to make the light-entrance end 30D movable for alignment adjustment, the light-entrance end of the optical fiber is required to be separated by a substantial distance from a portion of the optical fiber at which the optical fiber is fixed to the package of the combined-laser-light source. On the other hand, in the case where alignment is adjusted by moving the condensing lens, it is possible to reduce the distance between the light-entrance end of the optical fiber and the portion of the optical fiber at which the optical fiber is fixed to the package, and the size of the package. Specifically, the applicants have achieved reduction of about 20 mm in the length of the package (in the direction in which the optical fiber extends) of a combined-laser-light source using a mechanism for adjusting alignment by movement of the condensing lens, in comparison with a combined-laser-light source using a mechanism for adjusting alignment by movement of the optical fiber.

When the size of the package can be reduced, it is possible to reduce the time necessary for the combined-laser-light source to reach a thermally stable state. Therefore, it is easier to maintain a steady temperature-controlled state of the combined-laser-light source even when the external environment changes. In other words, it is possible to realize a module of a combined-laser-light source which is resistant to change in the external environment from the viewpoint of the startup time performance.

Overall Construction of Exposure System

Hereinbelow, an exposure system in which exposure heads each using the combined-laser-light source according to the present invention are mounted is explained. As well as the combined-laser-light source, the exposure system explained below also comprises a spatial light-modulation device, and an image-forming optical system. In the spatial light-modulation device, a plurality of light-modulation elements are arrayed, and light-modulation conditions in the plurality of light-modulation elements are respectively changed according to control signals so that the plurality of light-modulation elements individually and optically modulate and output respective portions of the bundle of laser beams combined in the optical fiber when the respective portions are incident on the plurality of light-modulation elements. The image-forming optical system forms an image on an exposure surface with the bundle of laser beams combined in the optical fiber and optically modulated by and outputted from the spatial light-modulation device.

FIG. 14 is a perspective view of an exposure system using combined-laser-light sources according to the present invention.

As illustrated in FIG. 14, the exposure system in which combined-laser-light sources according to the present invention are mounted comprises a scanner unit 162 and a main body which supports the scanner 162. The main body comprises a planar stage 152 and two guides 158. The stage 152 holds on its surface by suction a sheet 150 made of a photosensitive material. The guides 158 are arranged on a mount table 156, extend in a subscanning direction, and support the stage 152 so that the stage 152 can move in either direction parallel to the subscanning direction. The stage 152 is placed on the two guides 158 so that the length direction of the stage 152 corresponds to a direction in which the stage 152 moves. In addition, the exposure system of FIG. 14 is provided with a driving device (not shown) for moving the stage 152 along the guides 158.

A scanner supporter 160 having a shape of a gate is arranged at the center of the mount table 156 so that the scanner supporter 160 straddles the path of the stage 152. Two ends of the scanner supporter 160 are respectively fixed to side surfaces of the mount table 156. A scanner 162 is fixed to one side of the scanner supporter 160 in the subscanning direction, and a plurality of sensors 164 (e.g., two sensors) are fixed to the other side of the scanner supporter 160, in such a manner that the scanner 162 and the sensors 164 are fixedly located above the path of the stage 152. The plurality of sensors 164 are provided for detecting front and rear edges of the photosensitive sheet 150. The scanner 162 and the sensors 164 are connected to a controller (not shown) which controls the scanner 162 and the sensors 164.

Figure 16A:
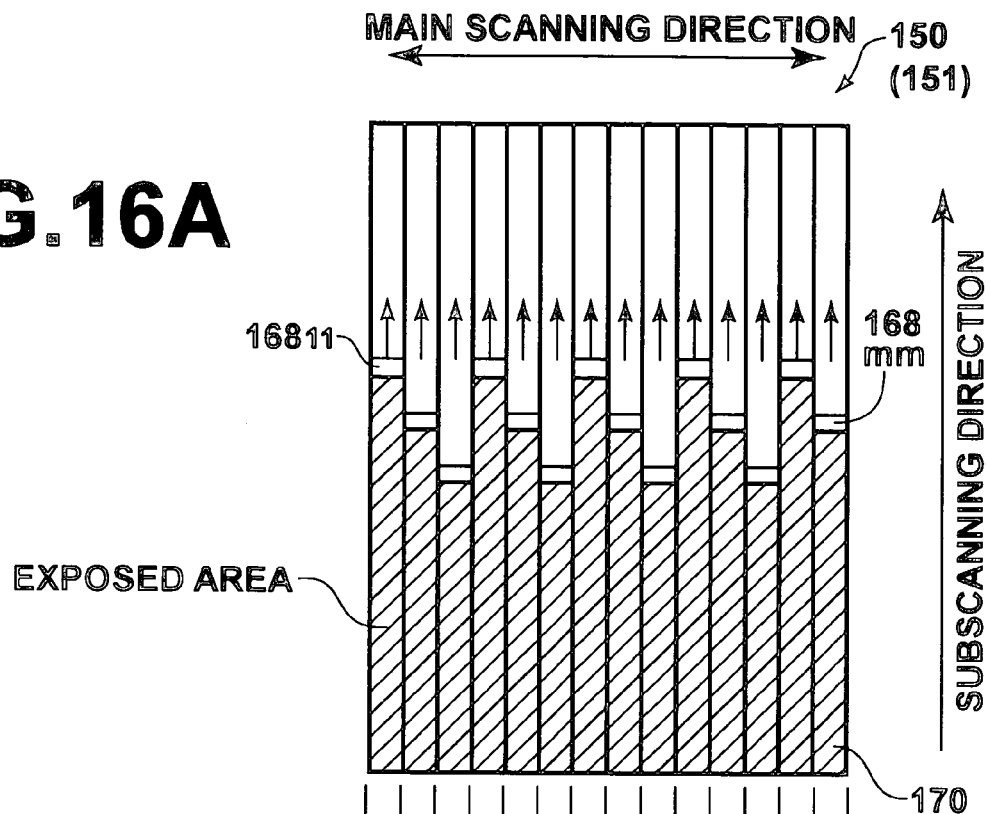
FIG. 16A is a plan view of a photosensitive material, and indicates exposed areas in the photosensitive material.
Figure 16B:
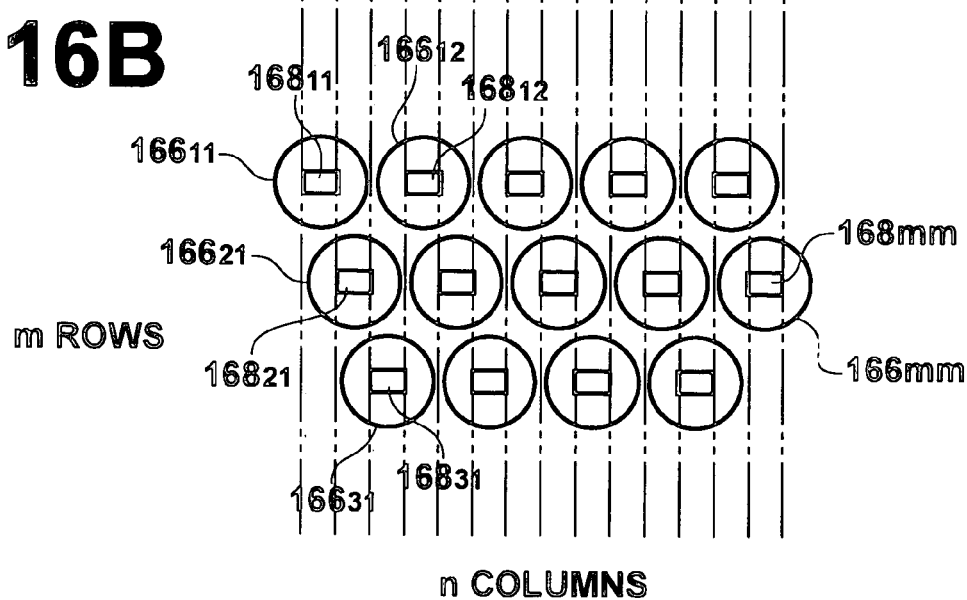
FIG. 16B is a diagram illustrating an arrangement of exposure areas produced by a plurality of exposure heads.

FIG. 15 is a schematic perspective view of a scanner portion of the exposure system of FIG. 14, FIG. 16A is a plan view of a photosensitive material, and indicates exposed areas in the photosensitive material, FIG. 16B is a diagram illustrating an arrangement of exposure areas produced by a plurality of exposure heads.

As illustrated in FIGS. 15 and 16B, the scanner 162 comprises a plurality of exposure heads 166 (e.g., fourteen exposure heads) which are arranged in nearly an m×n matrix (e.g., a matrix with three rows and five columns), and apply exposure light to the photosensitive sheet 150. In this example, five exposure heads are arranged in each of the first and second rows, and four exposure heads are arranged in the third row, based on consideration of the width of the photosensitive sheet 150. Hereinafter, for example, the exposure head located in the mth row and nth column is referred to as the exposure head 166mn.

As illustrated in FIG. 16B, the exposure area 168mn exposed with each of the exposure heads 166mn has a rectangular shape, and the shorter side of each exposure head is approximately oriented in the subscanning direction. Therefore, when the stage 152 moves, bandlike exposed areas 170 are formed on the photosensitive sheet 150 in correspondence with the exposure heads 166, respectively, as illustrated in FIG. 16A. Hereinafter, for example, the exposure area exposed by the exposure head 166mn in the mth row and nth column is referred to as the exposure area 168mn.

In addition, as illustrated in FIGS. 16A and 16B, in order that the bandlike exposed areas 170 are closely arranged in the main-scanning direction perpendicular to the subscanning direction, exposure heads linearly arranged in each row are shifted by a predetermined amount in the main-scanning direction from exposure heads linearly arranged in an adjacent row. Therefore, for example, areas which are located between the exposure areas 16811 and 16812 of the exposure heads 16611 and 16612 in the first row, and are not covered by the exposure areas 16811 and 16812 can be covered by the exposure areas 16821 and 16831 of the exposure heads 16621 and 16631 in the second and third rows.

Figure 17:
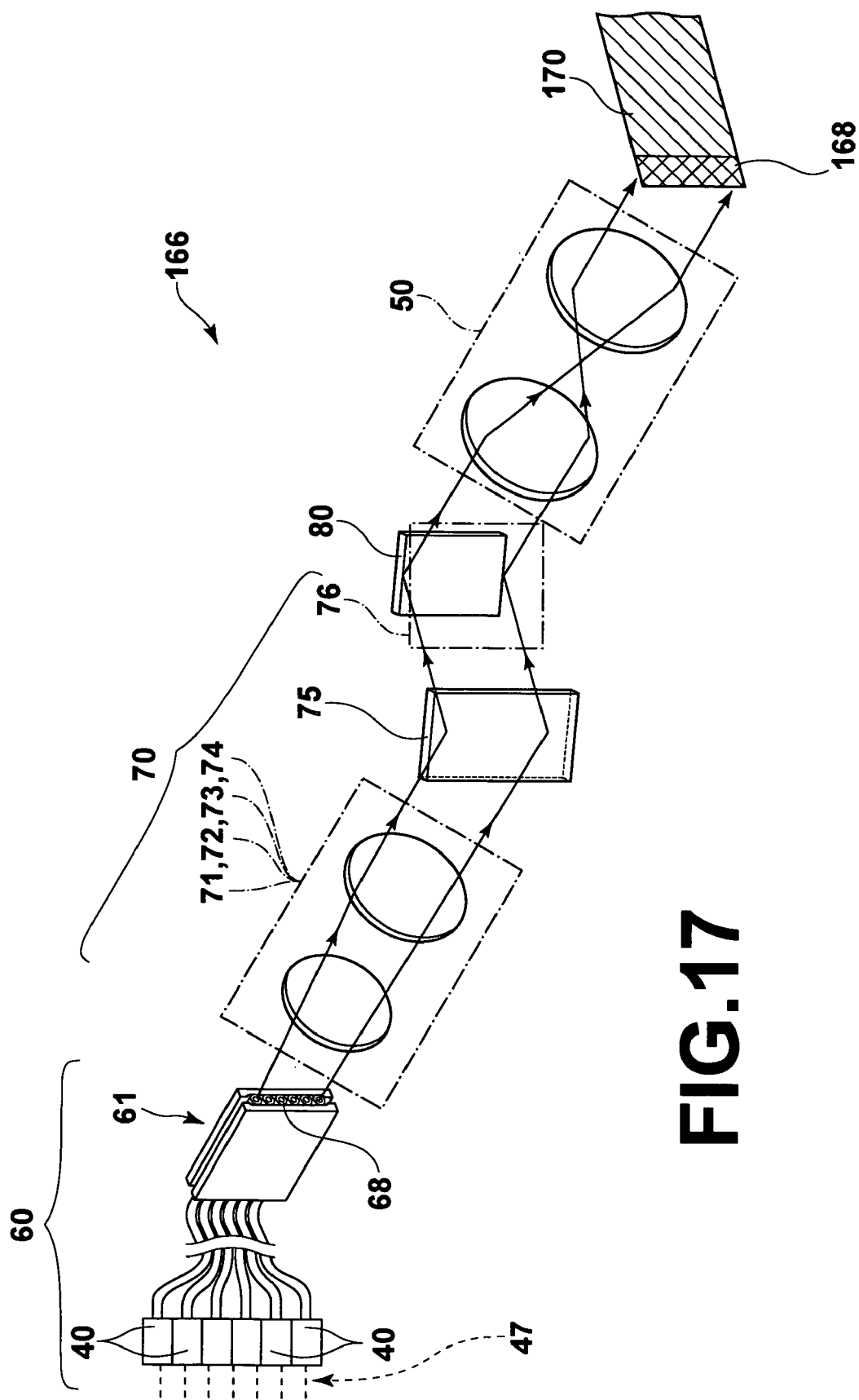
FIG. 17 is a schematic perspective view of one of the exposure heads in the exposure system of FIG. 14.
Figure 18:
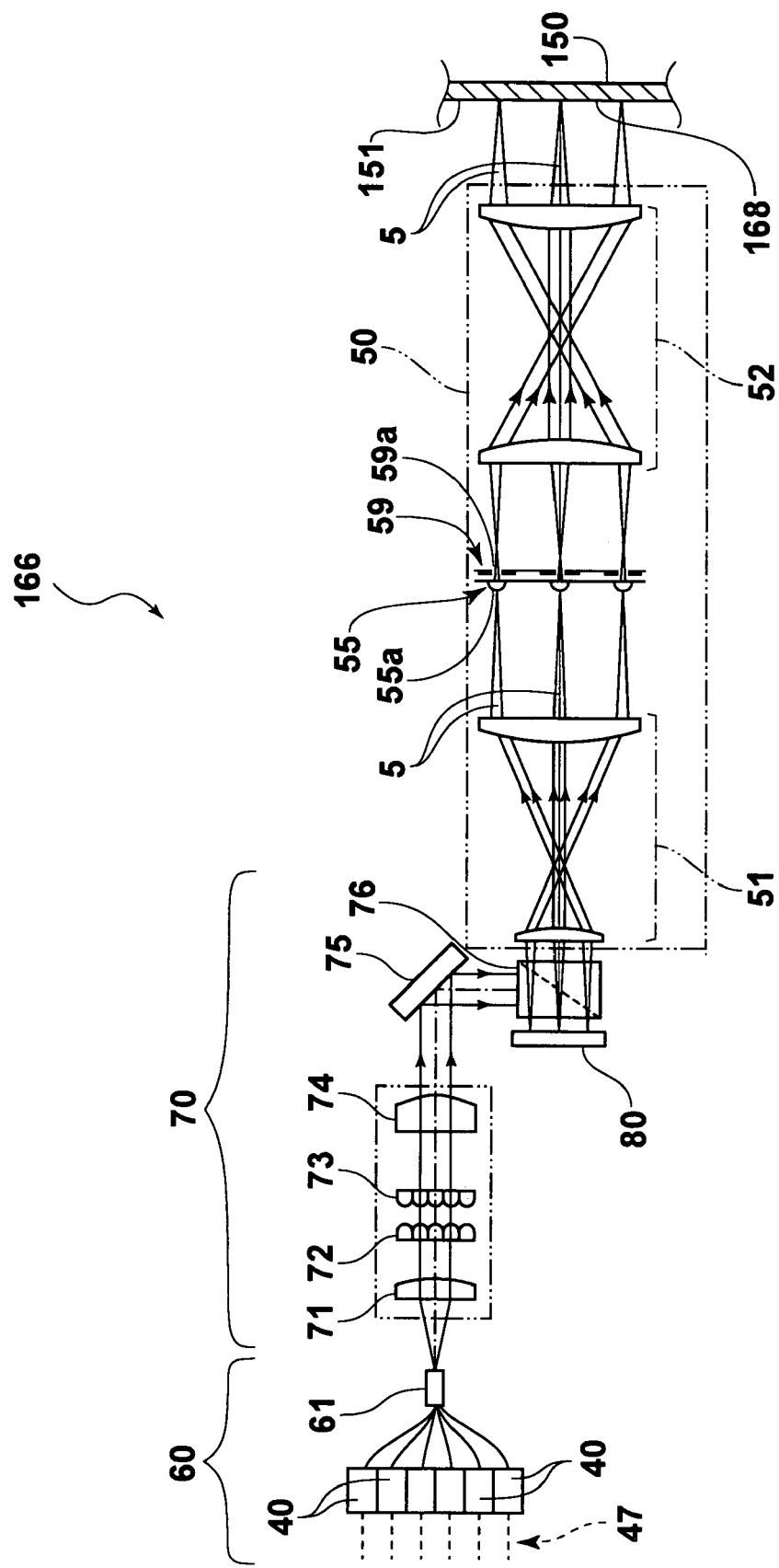
FIG. 18 is an unfolded cross-sectional view of the exposure head of FIG. 17 at an unfolded cross section along optical paths of laser light propagating through the exposure head.

FIG. 17 is a schematic perspective view of one of the exposure heads in the exposure system of FIG. 14, and FIG. 18 is an unfolded cross-sectional view of the exposure head of FIG. 17 at an unfolded cross section along optical paths of laser light propagating through the exposure head.

As illustrated in FIGS. 17 and 18, each of the exposure heads 166 comprises a light-source unit 60, a DMD-illumination optical system 70, a DMD 80, and an image-forming optical system 50. The light-source unit 60 emits exposure light, which enters the DMD-illumination optical system 70. The DMD-illumination optical system 70 illuminates the DMD 80 with the exposure light. The DMD 80 spatially modulates the exposure light. The image-forming optical system 50 forms an image on the photosensitive sheet 150 with the spatially modulated exposure light. Thus, the exposure light emitted from the light-source unit 60 is spatially modulated by the DMD 80, and is then lead to the photosensitive sheet 150 so as to expose the photosensitive sheet 150 with the spatially modulated exposure light.

Hereinbelow, the respective constituents of the exposure heads 166 are explained.

Light-Source Unit 60

The light-source unit 60 comprises a plurality of (e.g., six) combined-laser-light sources 40 and a laser-emission portion 61. Each of the combined-laser-light sources 40 is constructed according to the present invention as explained before. A plurality of optical fibers 31, which are respectively connected to the multimode optical fibers 30 in the combined-laser-light sources 40, are bundled in the laser-emission portion 61. The laser-emission portion 61 is explained in detail below with reference to FIGS. 19A, 19B, 19C, 19D, and 20.

FIG. 19A is a perspective view of the light-source unit, and indicates a manner of connection of the multimode optical fibers 30 in the combined-laser-light sources 40 and the optical fibers 31, FIG. 19B is a magnified view of the laser-emission portion of the light-source unit of FIG. 19A, FIG. 19C is a magnified front view of a first example of the laser-emission portion of the light-source unit of FIG. 19A, and indicates a first example of arrangement of optical fibers in the laser-emission portion, and FIG. 19D is a magnified front view of a second example of the laser-emission portion of the light-source unit of FIG. 19A, and indicates a second example of arrangement of optical fibers in the laser-emission portion.

As illustrated in FIG. 19B, the laser emission portion 61 comprises the optical fibers 31, support plates 65, and a protection plate 63, and has a construction explained below.

As illustrated in FIG. 19A, the light-emission end of the multimode optical fiber 30 in each of the combined-laser-light sources 40 is coupled to a light-entrance end of one of the optical fibers 31, where the optical fiber 31 has an identical core diameter to the multimode optical fiber 30 and a smaller cladding diameter than the multimode optical fiber 30. As illustrated in FIG. 19C, at the laser-emission end 68 of the laser emission portion 61, the light-entrance ends of the optical fibers 31 may be arranged along a line. Alternatively, as illustrated in FIG. 19D, it is possible to arrange the light-entrance ends of the optical fibers 31 in two rows.

As illustrated in FIG. 19B, the portions of the optical fibers 31 in the vicinity of light-emission ends of the optical fibers 31 are fixed by being sandwiched by two support plates 65 which have flat surfaces. In addition, in order to protect the end faces of the optical fibers 31, the protection plate 63, which is transparent and made of, for example, glass, is arranged on the light-emission side of the optical fibers 31. The protection plates 63 may be arranged in contact with or proximity to the end faces of the optical fibers 31.

Figure 20:
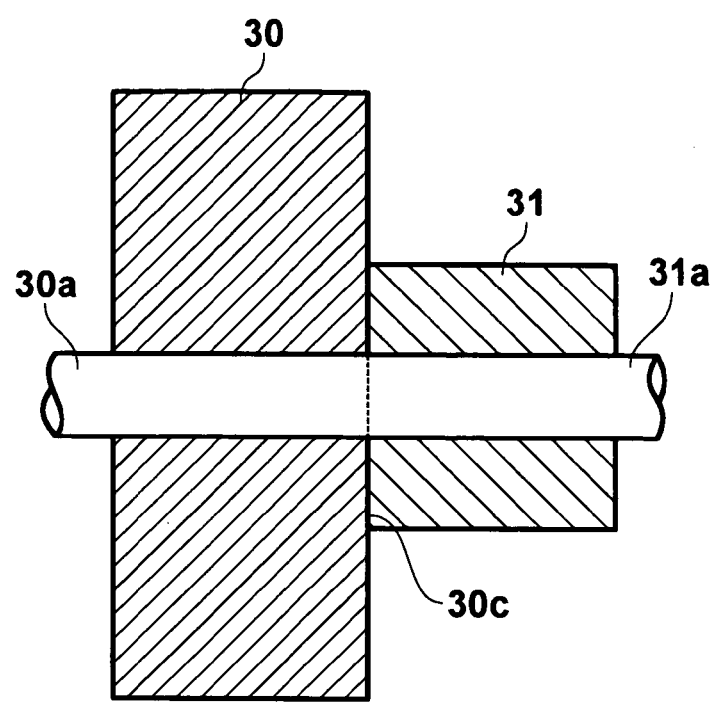
FIG. 20 is a cross-sectional view of an example of coupling of an optical fiber in a combined-laser-light source and an optical fiber in a laser-emission portion.

FIG. 20 is a cross-sectional view of an example of coupling of the multimode optical fiber 30 in each combined-laser-light source and one of the optical fibers 31 in the laser-emission portion. In the example of FIG. 20, a light-entrance end face of the optical fiber 31 having a smaller cladding diameter is coaxially coupled to an area 30c of the end face of the multimode optical fiber 30 having a greater cladding diameter, for example, by fusion.

Alternatively, it is possible to produce a short-length optical fiber by connecting an optical fiber having a small length and a great cladding diameter with an optical fiber having a small cladding diameter by fusion, and couple the short-length optical fiber to the light-emission end of the multimode optical fiber 30 through a ferrule, an optical connector, or the like. In the case where an optical fiber having a smaller cladding diameter is detachably coupled to each multimode optical fiber 30 by using a connector or the like, the optical fiber having a smaller cladding diameter can be easily replaced when the optical fiber having a smaller cladding diameter is damaged. Therefore, it is possible to reduce the maintenance cost of the exposure heads.

Each multimode optical fiber 30 and each optical fiber 31 may be a step-index type, a graded-index type, or composite-type optical fiber. For example, the multimode optical fiber 30 and the optical fiber 31 may be formed by using the step-index type optical fiber manufactured by Mitsubishi Cable Industries, Ltd. In this example, the multimode optical fibers 30 and the optical fibers 31 are a step-index type optical fiber. The multimode optical fibers 30 have a cladding diameter of 125 micrometers, a core diameter of 50 micrometers, and a numerical aperture (NA) of 0.2, and the light-entrance end face of the multimode optical fiber 30 is coated with a transmittance of 99.5% or greater. In addition, the optical fiber 31 has a cladding diameter of 60 micrometers, a core diameter of 50 micrometers, and a numerical aperture (NA) of 0.2.

DMD 80

Next, the DMD 80 is explained below.

Figure 21:
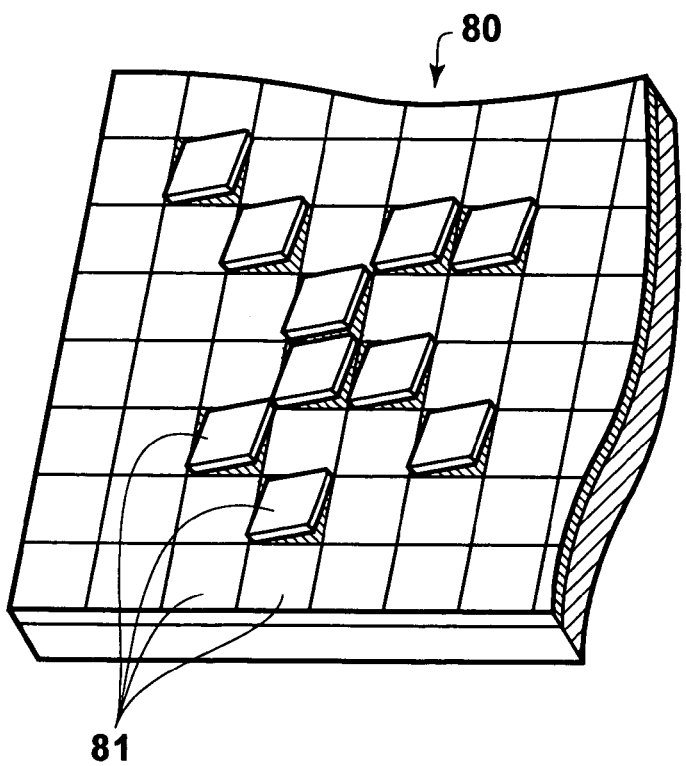
FIG. 21 is a magnified perspective view of a portion of a digital micromirror device (DMD).
Figure 22B:
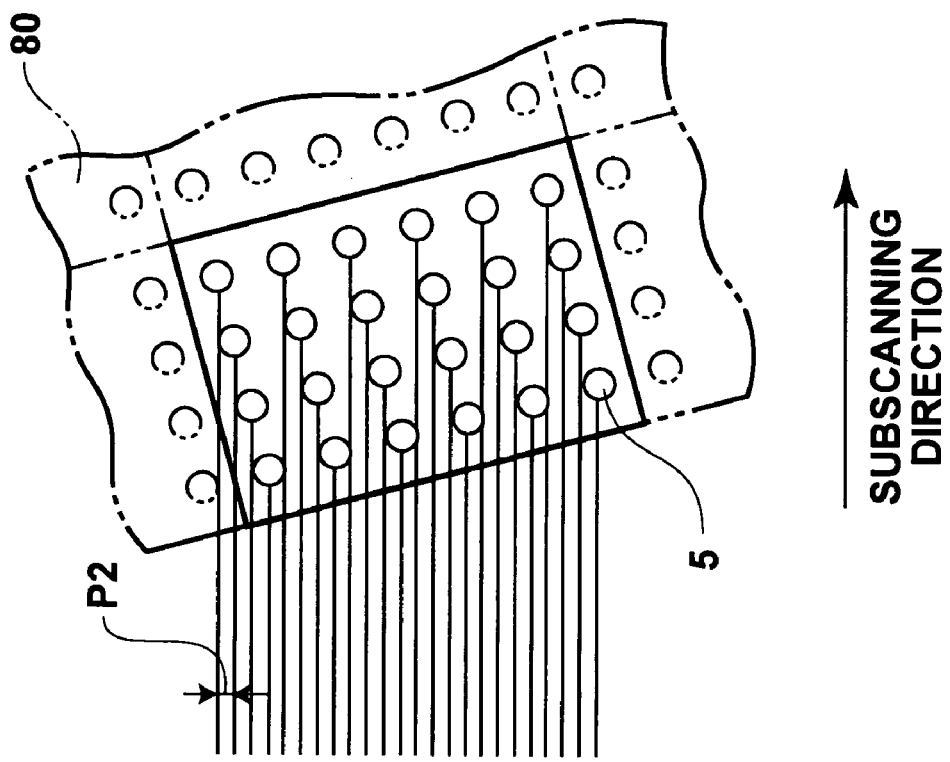
FIG. 22B is a schematic plan view illustrating the DMD which is rotated during scanning, and scanning lines corresponding to the exposure beams reflected from the rotated DMD.
Figure 22A:
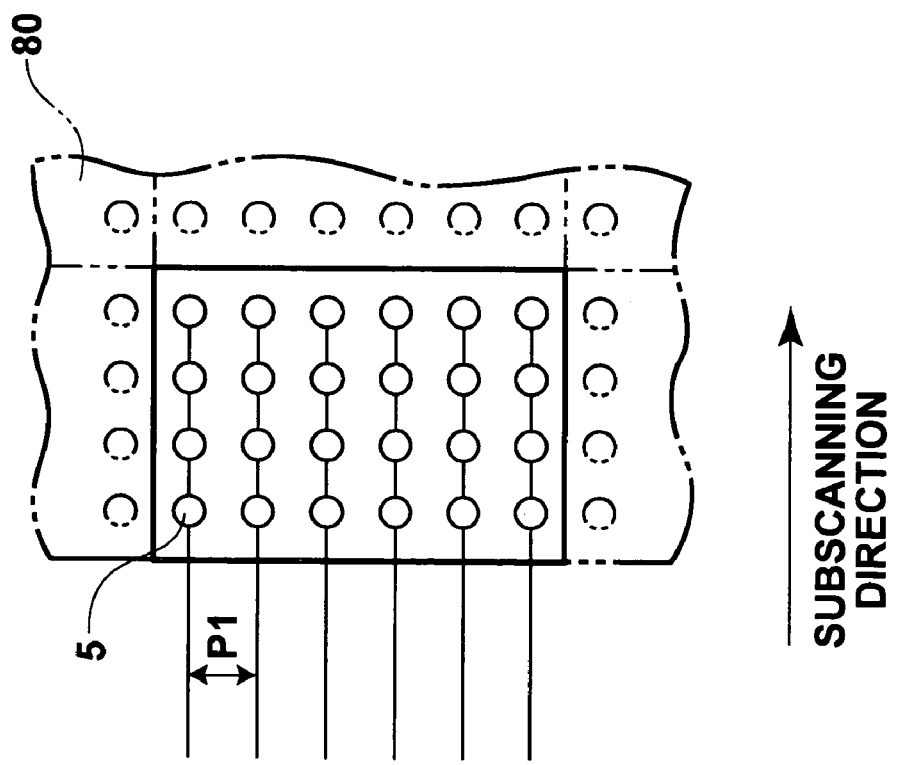
FIG. 22A is a schematic plan view illustrating the DMD which is not rotated during scanning, and scanning lines corresponding to the exposure beams reflected from the unrotated DMD.

FIG. 21 is a magnified perspective view of a portion of the digital micromirror device (DMD), FIG. 22A is a schematic plan view illustrating the DMD 80 which is not rotated during scanning, and scanning lines corresponding to the exposure beams reflected from the unrotated DMD 80, and FIG. 22B is a schematic plan view illustrating the DMD 80 which is rotated during scanning, and scanning lines corresponding to the exposure beams reflected from the rotated DMD 80.

As illustrated in FIGS. 17 and 18, each of the exposure heads 16611 through 166mn comprises the DMD 80 as a spatial light-modulation element which spatially modulates laser beams incident on the spatial light-modulation element according to image data inputted to the spatial light-modulation element.

The DMD 80 is a spatial light-modulation device in which a plurality of micromirrors are arrayed, and light-modulation conditions in the plurality of micromirrors are respectively changed according to control signals so that the plurality of micromirrors individually and optically modulate and output respective portions of laser light which is emitted from the combined-laser-light source and incident on the plurality of micromirrors.

Specifically, the DMD 80 is connected to a controller (not shown) which contains a data processing unit and a mirror-driving-control unit. The data-processing unit in the controller generates for each exposure head a control signal for controlling driving of the respective micromirrors 81 in the DMD 80 according to image data inputted to the DMD 80, as illustrated in FIG. 21. The mirror-driving-control unit controls the angle of a reflection surface of each micromirror 81 in the DMD 80 in each exposure head based on the control signal generated by the data-processing unit.

When each of the micromirrors 81 is in an on state, the micromirror is tilted at a first predetermined angle so that light reflected by the micromirror is directed toward the image-forming optical system 50. On the other hand, when each of the micromirrors 81 is in an off state, the micromirror is tilted at a second predetermined angle, which is different from the first predetermined angle, so that light reflected by the micromirror deviates from the optical path to the image-forming optical system 50.

The DMD is commercially available from, for example, Texas Instruments Incorporated, and various devices using DMDs, such as projectors which use the DMD and are designed for projecting moving images, are also commercially available.

In the DMD 80, a great number of micromirror arrays (e.g., 756 micromirror arrays) in each of which a great number of micromirrors (e.g., 1,024 micromirrors) are arranged in the direction of the shorter side of the DMD 80 are arranged in the direction of the longer side of the DMD 80. As illustrated in FIGS. 22A and 22B, the pitch P2 of the scanning traces in the subscanning direction (i.e., subscanning lines) of the exposure beams 53 reflected by the respective micromirrors 81 in the DMD 80 which is appropriately rotated in the plane parallel to the DMD 80 (as illustrated in FIG. 22B) becomes smaller than the pitch P1 of the scanning lines of the exposure beams 53 reflected by the respective micromirrors 81 in the DMD 80 which is not rotated in the plane parallel to the DMD 80 (as illustrated in FIG. 22A). Therefore, the resolution in exposure using the exposure heads 166 can be greatly increased by the rotation of the DMD 80.

In addition, since areas of the photosensitive sheet 150 along identical scanning lines are repeatedly exposed with light beams reflected by different micromirrors (i.e., multiple exposure is performed), the exposure positions can be finely controlled, i.e., highly fine exposure can be realized. Further, the fine control of the exposure positions can make boundaries between exposure beams 5 emitted from exposure heads arranged to each other in the main scanning direction unobtrusive.

DMD-Illumination Optical System 70

As illustrated in detail in FIG. 18, the DMD-illumination optical system 70 comprises a collimator lens 71, a first micro fly-eye lens array 72, a second micro fly-eye lens array 73, a field lens 74, a mirror 75, and a prism 76. The collimator lens 71 roughly collimates the entire bundle of laser beams emitted from the laser emission portion 61 of the light-source unit 60. The first micro fly-eye lens array 72 and the second micro fly-eye lens array 73 are placed in an optical path of light which has passed through the collimator lens 71 so as to face each other. The field lens 74 is placed on the forward side of the second micro fly-eye lens array 73, i.e., on the side toward the mirror 75.

The mirror 75 reflects light which has passed through the field lens 74, and the prism 76 is a TIR (total internal reflection) prism which further reflects (totally internally reflects) the light reflected by the mirror 75, toward the DMD 80.

Each of the first micro fly-eye lens array 72 and the second micro fly-eye lens array 73 is constituted by a great number of microlens cells which are two-dimensionally arranged. The laser light emitted from the light-source unit 60 passes through the first micro fly-eye lens array 72 and the second micro fly-eye lens array 73, are reflected by the mirror 75 and the prism 76, and are then incident on the DMD 80 in such a manner that a great number of portions of the light which have passed through the first micro fly-eye lens array 72 and the second micro fly-eye lens array 73 are superimposed on each other. Therefore, the distribution of the quantity of light incident on the DMD 80 becomes uniform. That is, the DMD-illumination optical system 70 illuminates the DMD 80 with light having a roughly uniform intensity distribution.

Image-Forming Optical System 50

The image-forming optical system 50 forms an image on the photosensitive sheet 150 (as an exposure plane) with the laser light which is spatially and optically modulated by the DMD 80 as a spatial light-modulation device.

As illustrated in FIG. 18, the image-forming optical system 50 comprises a first image-forming optical system 51, a second image-forming optical system 52, a microlens array 55, and an aperture array 59. The microlens array 55 and the aperture array 59 are placed in an optical path between the first and second image-forming optical systems. The microlens array 55 is constituted by a great number of microlenses 55a respectively arranged in correspondence with a great number of pixels constituting the DMD 80 so that light beams respectively reflected by the micromirrors 81 individually pass through the corresponding ones of the microlenses 55a. The aperture array 59 is constituted by a great number of apertures 59a respectively arranged in correspondence with the microlenses 55a so that the light beams which have passed through the microlenses individually pass through the corresponding ones of the apertures 59a.

In the construction of FIG. 18, the first image-forming optical system 51 magnifies by three times an image represented by light which is reflected by the micromirrors 81 in the DMD 80. The respective light beams which have passed through the first image-forming optical system 51 are individually collected by the aforementioned microlenses 55a in the microlens array 55, where the microlenses 55a are arranged in vicinities of a position at which the first image-forming optical system 51 forms the magnified image. Then, the light beams individually collected by the respective microlenses 55a pass through the aforementioned apertures 59a of the aperture array 59, and form the magnified image. The second image-forming optical system 52 further magnifies by 1.67 times the image magnified by the first image-forming optical system 51, and the image magnified by the second image-forming optical system 52 is formed on a photosensitive surface 151. Thus, the image represented by light reflected by the micromirrors 81 in the DMD 80 is magnified by five (=3×1.67) times in total by the first and second image-forming optical systems 51 and 52, and projected onto the photosensitive surface 151.

According to the above construction of the image-forming optical system 50, even when the laser beams which are reflected by the micromirrors 81 and pass through the microlenses 55a are thickened due to aberration and the like in the optical elements, it is possible to shape the laser beams with the apertures 59a so that the sizes of spots formed by the shaped laser beams on the photosensitive surface 151 are constant. In addition, since the laser beams reflected by the micromirrors 81 (for respective pixels) pass through the apertures 59a arranged in correspondence with the micromirrors 81, respectively, it is possible to prevent crosstalk between the pixels, and improve the extinction ratio in exposure in which on-off operations in the micromirrors 81 are reflected.

Operations of Exposure System

Hereinbelow, operations of the exposure system are explained.

When the exposure system is started up, the respective portions of the exposure system are also started up. In particular, the temperature control of the combined-laser-light source 40 is started. However, at this time, the GaN-based semiconductor lasers LD1 through LD7 are not yet powered on.

Image data corresponding to an exposure pattern is inputted into the controller (not shown) connected to the DMD 80, and is temporarily stored in a frame memory provided in the controller. The image data is data representing the density of each pixel constituting an image. For example, the image data represents the density of each pixel by a binary value indicating whether or not a dot is to be recorded.

Referring back to FIGS. 14 and 15, the stage 152 which holds a photosensitive sheet 150 on its surface by suction is moved at a constant speed by the aforementioned driving device (not shown) along the guides 158 from the upstream side to the downstream side of the scanner supporter 160. When the stage 152 passes under the scanner supporter 160, and the front edge of the photosensitive sheet 150 is detected by the sensors 164 fixed to the scanner supporter 160, the image data stored in the frame memory is read out in groups of a plurality of lines, and a control signal for each of the exposure heads 166 is generated by the aforementioned data-processing unit based on the image data which is read out.

Thereafter, when the exposure system becomes ready to expose the photosensitive sheet 150, the GaN-based semiconductor lasers LD1 through LD7 are powered on, and the mirror-driving-control unit controls each of the micromirrors 81 in the DMD 80 in each exposure head 166 based on the control signal generated as above. Since the startup time of each combined-laser-light source 40 is short, it is possible to start the exposure of the photosensitive sheet 150 by using laser light emitted from the combined-laser-light sources 40, immediately after the powering on of the GaN-based semiconductor lasers LD1 through LD7.

When laser beams generated by the combined-laser-light sources 40 and emitted from the laser emission portion 61 is applied through the DMD-illumination optical system 70 to the DMD 80, portions of the laser beams reflected by portions of the micromirrors 81 which are in the on state pass through the image-forming optical system 50, and form an image on the photosensitive surface 151 of the photosensitive sheet 150. On the other hand, the other portions of the laser beams reflected by the other portions of the micromirrors 81 which are in the off state do not form an image on the photosensitive surface 151, i.e., do not expose the photosensitive sheet 150.

As explained above, the laser beams emitted from the light-source unit 60 are on-off controlled on a micromirror-by-micromirror basis (on a pixel-by-pixel basis), the exposure areas 16811 and 168mn corresponding to the exposure heads 16611 through 166mn on the photosensitive sheet 150 are exposed as illustrated in FIGS. 15 and 16. In addition, as the stage 152 on which the photosensitive sheet 150 is placed is moved in the subscanning direction, the bandlike exposed areas 170 extending in the subscanning direction are formed by the respective exposure heads 166.

When an operation of exposure based on image data stored in the frame memory in the controller connected to the DMD 80 is completed, the GaN-based semiconductor lasers LD1 through LD7 are powered off, and emission of laser light from the combined-laser-light sources 40 is stopped. Thereafter, when the subscanning of the photosensitive sheet 150 by the scanner 162 is completed, and the rear edge of the photosensitive sheet 150 is detected, the driving device (not shown) moves the stage 152 back to its initial position along the guides 158, where the initial position is the most upstream position of the guides 158. Then, the driving device moves the stage 152 again from upstream to downstream along the guides 158 at the constant speed for the next exposure operation.

Since the startup times of the combined-laser-light sources 40 are short, even when the GaN-based semiconductor lasers LD1 through LD7 are powered on after the exposure system is ready to expose the next photosensitive sheet 150, the combined-laser-light sources 40 can immediately emit laser beams having a predetermined output power. Therefore, it is possible to power on the semiconductor lasers only when the photosensitive sheet 150 is actually exposed, without interfering with other operations of the exposure system.

Since the GaN-based semiconductor lasers LD1 through LD7 in each combined-laser-light source 40 are powered on only when a photosensitive material 150 is exposed, the apparent lifetimes of the GaN-based semiconductor lasers LD1 through LD7 can be greatly increased.

For example, since the exposure time for which exposure operations are actually performed, i.e., the time for which the GaN-based semiconductor lasers in the combined-laser-light sources 40 are powered on, is about half of the operating time of the exposure system, the apparent lifetimes of the semiconductor lasers is doubled compared with the case where the GaN-based semiconductor lasers in the combined-laser-light sources 40 are continuously powered on through the operating time of the exposure system. For example, in the case where the operating time of the exposure system is eight hours per day, and the lighting rates of the combined-laser-light sources 40 during the operating time of the exposure system is 50%, and the lifetimes of the GaN-based semiconductor lasers are 10,000 hours, it is possible to use the GaN-based semiconductor lasers in the exposure system for about seven years (2,500 days ≈10,000 hours×2÷8 hours), and approximately equalize the lifetimes of the GaN-based semiconductor lasers with the lifetimes of the exposure system.

Partial Use of DMD 80

Figure 23A:
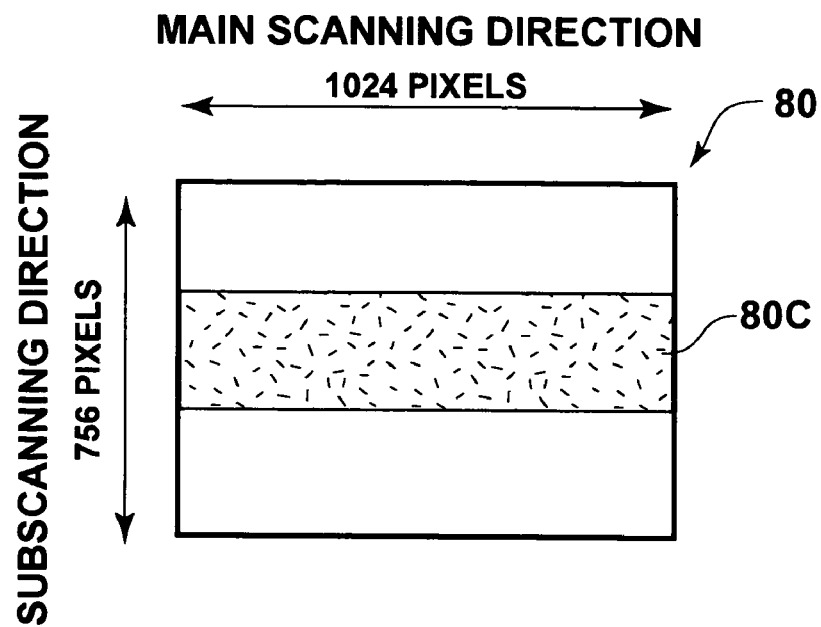
FIGS. 23A and 23B are diagrams indicating examples of used areas of the DMD.
Figure 23B:
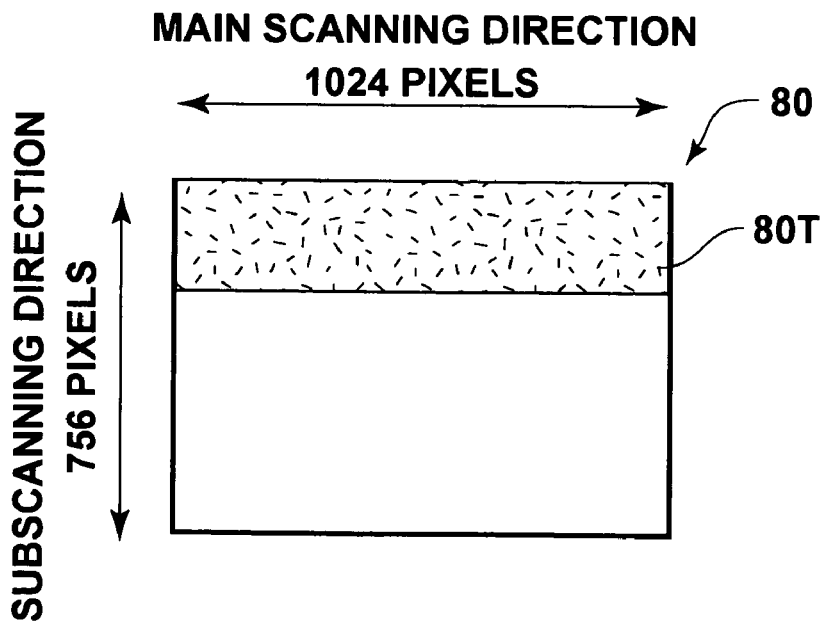

FIGS. 23A and 23B are diagrams indicating examples of used areas of the DMD. In the DMD 80 used in the present embodiment, 756 micromirror arrays (pixel arrays), in each of which 1,024 micromirrors (pixels) are aligned in the main scanning direction, are arranged in the subscanning direction. In this example, the controller controls the DMD 80 in such manner that only a portion of the DMD 80 constituted by 1,024×300 pixels is driven.

For example, the driven portion may be located at the center of the DMD 80 as indicated by the reference 80C in FIG. 23A, or at an end of the DMD 80 as indicated by the reference 80T in FIG. 20B. Further, it is possible to change the driven portion according to the circumstances. For example, when a defect is detected in a micromirror, it is possible to use a portion of the micromirrors 81 which does not contain the defective micromirror.

The data processing speed of the DMD 80 has an upper limit. Since the modulation rate per line is determined by (i.e., proportional to) the number of used micromirrors (pixels), the modulation rate per line can be increased when only a portion of the micromirror arrays is used.

Variations and Additional Matters (i) Although the combined-laser-light source according to the present invention is used in an exposure system in the above embodiment, the present invention can also be applied to other systems. For example, the combined-laser-light source according to the present invention can be used in projectors which project an image onto a screen for display. Even when the combined-laser-light source according to the present invention is used in a system other than an exposure system, the system also has the advantages which are explained before for the exposure system.

(ii) The combined-laser-light source according to the present invention can also be constructed by using any semiconductor lasers other than the GaN-based semiconductor lasers.

(iii) In the combined-laser-light source according to the present invention, the optical fiber which the laser beams enter and are combined in is not limited to the multimode optical fiber, and may be any type of optical fiber in which laser beams can be combined.

(iv) The optical system for converging laser beams emitted from a plurality of semiconductor lasers may be realized by any construction which has the function of converging an entire bundle of laser beams emitted from a plurality of semiconductor lasers into a point.

(v) It is possible to adjust alignment of laser light to be combined, by movement of both of the light-emission end of the optical fiber in the direction parallel to the light-emission end face of the optical fiber and the convergence lens in the direction perpendicular to the optical axis of the convergence lens.

That is, it is possible to adjust alignment of laser light to be combined, by combining the laser-light alignment methods according to the first and second aspects of the present invention.

What is claimed is:

1. A laser-light alignment method for adjusting alignment of laser light in a combined-laser-light source in which a bundle of laser beams emitted from a plurality of semiconductor lasers is converged through an optical system and enters a core portion of a light-entrance end of an optical fiber so that the laser beams are combined in the optical fiber, and the combined laser beams are outputted from a light-emission end of the optical fiber, said laser-light alignment method comprising:

(a) maintaining said combined-laser-light source in a condition in which steady temperature control is performed;

(b) measuring light intensity of the combined laser beams outputted from the light-emission end of the optical fiber, while moving said light-entrance end of the optical fiber in a direction parallel to an end face at the light-entrance end so that a center of an area of the end face through which the laser beams emitted from the plurality of semiconductor lasers enter the optical fiber moves along a diameter passing through a center of said core portion;

(c) determining two positions of said light-entrance end at which the light intensity measured in step (b) is equal to a certain value which is smaller than a maximum value of the light intensity measured in step (b); and (d) aligning a center of said core portion of said optical fiber with a middle position between said two positions determined in step (c).

2. A laser-light alignment method for adjusting alignment of laser light in a combined-laser-light source in which a bundle of laser beams emitted from a plurality of semiconductor lasers is converged through a convergence lens and enters a core portion of a light-entrance end of an optical fiber so that the laser beams are combined in the optical fiber, and the combined laser beams are outputted from a light-emission end of the optical fiber, said laser-light alignment method comprising:

(a) maintaining said combined-laser-light source in a condition in which steady temperature control is performed;

(b) measuring light intensity of the combined laser beams outputted from the light-emission end of the optical fiber, while moving said convergence lens in a direction perpendicular to an optical axis of the convergence lens so that a center of an area of the end face through which the laser beams emitted from the plurality of semiconductor lasers enter the optical fiber moves along a diameter passing through a center of said core portion;

(c) determining two positions of the optical axis of said convergence lens at which the light intensity measured in step (b) is equal to a certain value which is smaller than a maximum value of the light intensity measured in step (b); and (d) placing said the optical axis of said convergence lens at a middle position between said two positions determined in step (c).

3. A combined-laser-light source comprising:
a plurality of semiconductor lasers;
an optical fiber which has a core; and
an optical system which converges a bundle of laser beams emitted from said plurality of semiconductor lasers, and makes the converged bundle of the laser beams enter the core of said optical fiber so that the laser beams are combined in the optical fiber when the laser beams pass through the optical fiber;
wherein said optical system and said optical fiber are aligned with each other so that the converged bundle of the laser beams is incident on an area of an end face of the core when steady temperature control is performed on said combined-laser-light source, where the area is concentric with the end face of the core, and has a diameter equal to or smaller than half of a diameter of the core.

4. A combined-laser-light source according to claim 3, wherein said plurality of semiconductor lasers are GaN-based compound semiconductor lasers.

5. A combined-laser-light source according to claim 3, wherein said optical fiber is a multimode optical fiber.

6. A combined-laser-light source according to claim 4, wherein said optical fiber is a multimode optical fiber.

7. An exposure system comprising:
a combined-laser-light source which includes,
a plurality of semiconductor lasers,
an optical fiber which has a core, and
an optical system which converges a bundle of laser beams emitted from said plurality of semiconductor lasers, and makes the converged bundle of the laser beams enter the core of said optical fiber so that the laser beams are combined in the optical fiber when the laser beams pass through the optical fiber, where said optical system and said optical fiber are aligned with each other so that the converged bundle of the laser beams is incident on an area of an end face of the core when steady temperature control is performed on said combined-laser-light source, and the area is concentric with the end face of the core, and has a diameter equal to or smaller than half of a diameter of the core;
a spatial light-modulation device in which a plurality of light-modulation elements are arrayed, where light-modulation conditions in said plurality of light-modulation elements are respectively changed according to control signals so that said plurality of light-modulation elements individually and optically modulate and output respective portions of said bundle of laser beams combined in the optical fiber when the respective portions are incident on said plurality of light-modulation elements; and
an image-forming optical system which forms an image on an exposure surface with the respective portions of the bundle of laser beams combined in the optical fiber and optically modulated by and outputted from said plurality of light-modulation elements.

8. An exposure system according to claim 7, wherein said image-forming optical system comprises a microlens array comprised of a plurality of microlenses arrayed in correspondence with said plurality of light-modulation elements, respectively, so that the plurality of microlenses individually condense the respective portions of the bundle of laser beams combined in the optical fiber and optically modulated by and outputted from said plurality of light-modulation elements.

* * * * *